United States Patent
Hori et al.

(10) Patent No.: US 6,649,731 B2
(45) Date of Patent: Nov. 18, 2003

(54) CATALYSTS FOR POLYESTER PRODUCTION, PROCESS FOR PRODUCING POLYESTER, AND POLYESTER

(75) Inventors: Hideshi Hori, Yamaguchi (JP); Fujito Ehara, Yamaguchi (JP); Akiyoshi Shimizu, Yamaguchi (JP); Nobumasa Mukai, Yamaguchi (JP); Shoji Hiraoka, Yamaguchi (JP)

(73) Assignee: Mitsui Chemicals, Inc., Tokyo (JP)

( * ) Notice: Subject to any disclaimer, the term of this patent is extended or adjusted under 35 U.S.C. 154(b) by 34 days.

(21) Appl. No.: 10/110,920

(22) PCT Filed: Aug. 21, 2001

(86) PCT No.: PCT/JP01/07153
§ 371 (c)(1),
(2), (4) Date: Apr. 18, 2002

(87) PCT Pub. No.: WO02/16467
PCT Pub. Date: Feb. 28, 2002

(65) Prior Publication Data
US 2002/0193555 A1 Dec. 19, 2002

(30) Foreign Application Priority Data

Aug. 22, 2000 (JP) ........................................ 2000-251243
Aug. 22, 2000 (JP) ........................................ 2000-251244
Jun. 29, 2001 (JP) ........................................ 2001-198645

(51) Int. Cl.[7] .......................... C08G 63/78; B01J 31/00; C08K 3/08

(52) U.S. Cl. ...................... 528/279; 502/102; 502/103; 502/105; 502/107; 502/111; 502/118; 502/126; 528/275; 528/280; 528/281; 528/282; 528/283; 528/284; 528/285; 528/286; 528/302; 528/308; 528/308.6; 524/706; 524/779; 524/783; 524/784; 524/785; 524/786

(58) Field of Search ................................. 502/102, 103, 502/105, 107, 111, 126, 118; 528/275, 279, 280, 281, 282, 283, 284, 285, 286, 302, 308, 308.6; 524/706, 779, 783, 784, 785, 786

(56) References Cited

U.S. PATENT DOCUMENTS 3,463,742 A 8/1969 Bell et al. .................... 252/430
3,951,886 A 4/1976 Miyake et al.

(List continued on next page.)

FOREIGN PATENT DOCUMENTS

DE 3422733 A1 12/1985
EP 0 703 260 A1 3/1996

(List continued on next page.)

*Primary Examiner*—Samuel A. Acquah
(74) *Attorney, Agent, or Firm*—Burns Doane, Swecker & Mathis, LLP

(57) ABSTRACT

By the present invention, there are provided a catalyst for polyester preparation, which comprises a solid titanium compound containing titanium, oxygen, carbon and hydrogen and having a Ti—O bond and which has a maximum solubility in ethylene glycol, as measured when the catalyst is dissolved in ethylene glycol under heating at 150° C., of not less than 3,000 ppm in terms of a titanium atom, a catalyst for polyester preparation, which comprises a titanium-containing solution wherein a contact product of a hydrolyzate of a titanium halide or a hydrolyzate of a titanium alkoxide with a polyhydric alcohol is dissolved in ethylene glycol in an amount of 3,000 to 100,000 ppm in terms of a titanium atom, a process for preparing a polyester using the catalyst, and a polyester prepared by the process. According to the present invention, a polyester can be prepared with a higher catalytic activity as compared with a case of using a conventional catalyst, and a polyester having better transparency, better hue and lower acetaldehyde content can be obtained as compared with a process using an antimony compound as a polycondensation catalyst.

28 Claims, 1 Drawing Sheet

U.S. PATENT DOCUMENTS

| | | |
|---|---|---|
| 4,260,735 A | 4/1981 | Bander et al. |
| 4,611,049 A | 9/1986 | Kuratsuji et al. |
| 5,591,800 A | 1/1997 | Takekoshi et al. |
| 6,346,070 B1 * | 2/2002 | Ohmatsuzawa et al. .... 528/279 |

FOREIGN PATENT DOCUMENTS

| | | | |
|---|---|---|---|
| EP | 1013692 | * | 6/2000 |
| GB | 1 392 657 | | 4/1975 |
| JP | 07-64920 | | 7/1995 |
| JP | 08-092361 | | 4/1996 |

* cited by examiner

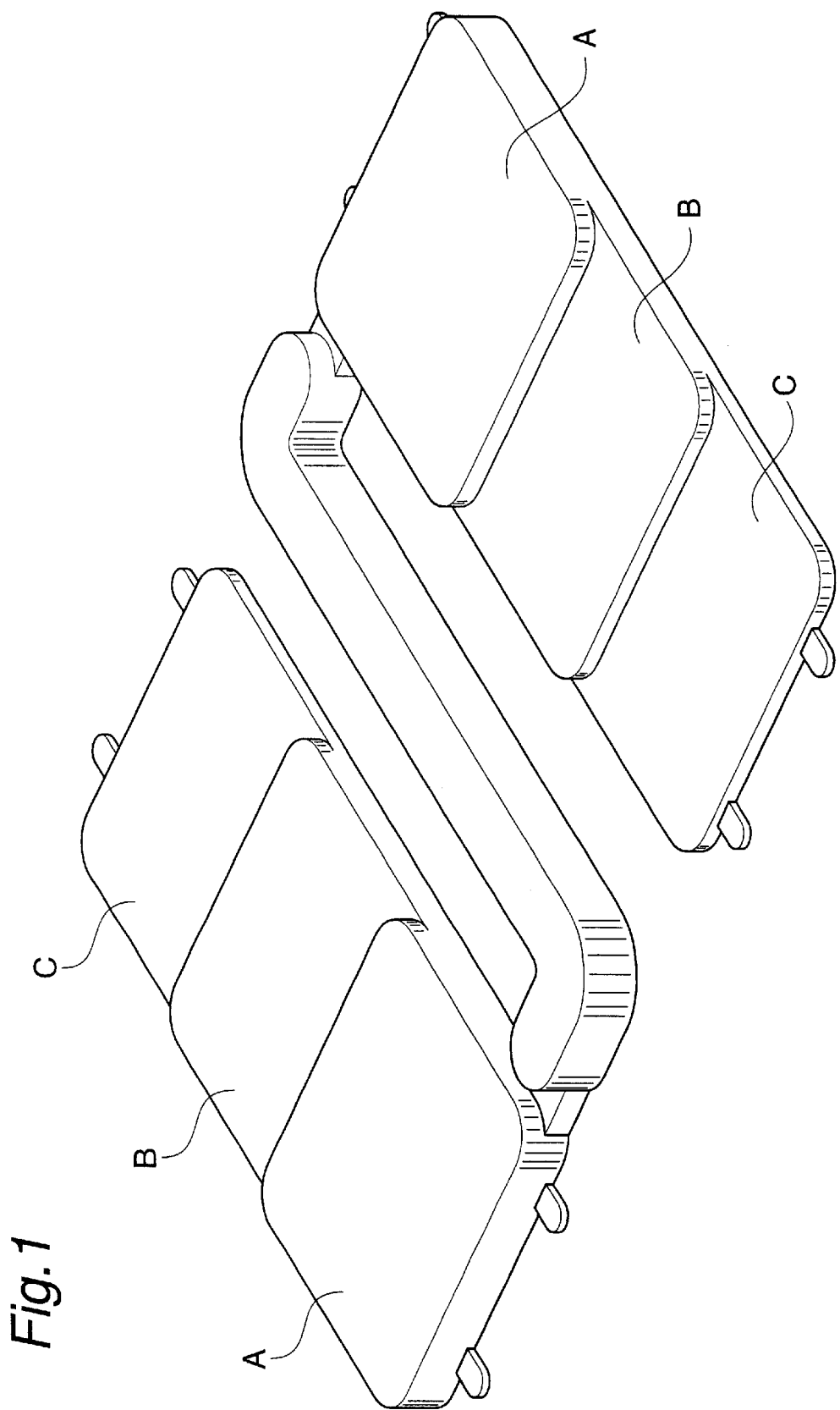

CATALYSTS FOR POLYESTER PRODUCTION, PROCESS FOR PRODUCING POLYESTER, AND POLYESTER

TECHNICAL FIELD

The present invention relates to a catalyst for polyester preparation, a process for preparing a polyester using the catalyst, and a polyester prepared by the use of the catalyst. More particularly, the invention relates to a catalyst for polyester preparation capable of polycondensing a dicarboxylic acid and a diol with excellent catalytic activity, a process for preparing a polyester using the catalyst, and a specific polyester prepared by the use of the catalyst.

BACKGROUND ART

Polyesters such as polyethylene terephthalate are excellent in mechanical strength, heat resistance, transparency and gas barrier properties, and they have been favorably used as materials of containers to be filled with beverages such as juices, soft drinks and carbonated beverages and materials of films, sheets, fibers and the like.

Such polyesters are conventionally prepared using a dicarboxylic acid such as terephthalic acid and a diol such as ethylene glycol as starting materials. More specifically, a low condensate (ester low polymer) is first formed by esterification reaction of a dicarboxylic acid with a diol, and then the low condensate is subjected to deglycolation reaction (liquid phase polycondensation) to give a high-molecular weight product. In some cases, solid phase polycondensation is additionally carried out to further increase the molecular weight.

In the process for preparing a polyester, an antimony compound, a germanium compound or the like has been hitherto used as a polycondensation catalyst.

However, polyethylene terephthalate prepared by the use of the antimony compound as a catalyst is inferior to polyethylene terephthalate prepared by the use of a germanium compound as a catalyst in transparency and heat resistance, so that improvement of the transparency and heat resistance in the former process has been desired. For the use of the antimony compound as a polycondensation catalyst, it has been also desired to reduce the acetaldehyde content in the resulting polyester.

In the use of the germanium compound, there resides a problem that the cost for the polyester production is high because the germanium compound is considerably expensive. On this account, a process of collecting and recycling the germanium compound scattered during the polycondensation has been studied to reduce the production cost.

It is known that titanium is an element having a function of accelerating polycondensation reaction of an ester low polymer, and titanium alkoxide, titanium tetrachloride, titanyl oxalate, orthotitanic acid and the like are publicly known as polycondensation catalysts. In order to use such titanium compounds as the polycondensation catalysts, many studies have been made.

For example, a slurry catalyst for polyester preparation in which a hydrolyzate of titanium tetrachloride is dispersed in an alcohol such as butanol is disclosed in U.S. Pat. No. 3,463,742.

The conventional titanium compound catalyst, when used as the polycondensation catalyst, however, is inferior to the antimony compound or the germanium compound in activity. The resulting polyester has a problem of being markedly colored yellow, so that its practical use has not been realized yet. In the industrial production of polyesters, a catalyst containing a large amount of chlorine, such as titanium tetrachloride or a partial hydrolyzate thereof causes a problem of corrosiveness associated with elution of a chlorine component, and hence a catalyst containing smaller amount of a chlorine component has been desired.

Under such circumstances as described above, the present inventors have earnestly studied polycondensation catalysts for use in the polyester preparation, and they have found that a polyester of high quality can be prepared with high catalytic activity by using, as a polycondensation catalyst, a titanium compound which is prepared by dehydro-drying a hydrolyzate obtained from a specific titanium compound.

The present inventors have further studied and, as a result, they have found that if a solid titanium compound obtained by contacting the hydrolyzate with a specific alcohol and then dehydro-drying the contact product in the above-mentioned catalyst preparation process, is used as a polycondensation catalyst, a polyester of high quality can be prepared with high catalytic activity. They have also found that if a titanium-containing solution in which the above-mentioned contact product of the hydrolyzate with the specific alcohol is dissolved in ethylene glycol, is used as a polycondensation catalyst, a polyester of high quality can be prepared with high catalytic activity. Based on the findings, the present invention has been accomplished.

That is to say, it is an object of the present invention to provide a catalyst for polyester preparation capable of preparing a polyester of excellent quality with excellent catalytic activity and a process for preparing a polyester using the catalyst. It is another object of the invention to provide a polyester of excellent transparency, hue, etc. obtained by the use of the catalyst.

DISCLOSURE OF THE INVENTION

The first catalyst for polyester preparation according to the invention comprises a solid titanium compound containing titanium, oxygen, carbon and hydrogen and having a Ti—O bond, and has a maximum solubility in ethylene glycol, as measured under heating at 150° C., of not less than 3,000 ppm in terms of a titanium atom.

The weight ratio (Ti/C) of the titanium atom to the carbon atom in the solid titanium compound is preferably in the range of 50 to 1.

The maximum solubility of the solid titanium compound in ethylene glycol is preferably in the range of 3,000 to 5,000 ppm in terms of a titanium atom.

The solid titanium compound preferably has an average particle diameter of 1 to 30 $\mu$m.

The solid titanium compound may further contain at least one element selected from the group consisting of beryllium, magnesium, calcium, strontium, barium, scandium, yttrium, lanthanum, zirconium, hafnium, vanadium, niobium, tantalum, chromium, molybdenum, tungsten, manganese, iron, ruthenium, cobalt, rhodium, nickel, palladium, copper, zinc, boron, aluminum, gallium, silicon, germanium, tin, antimony and phosphorus (these elements are also referred to as "other elements" hereinafter).

The solid titanium compounds referred to in this specification include solid titanium compounds containing other elements unless otherwise stated.

The solid titanium compound is a contact product of a hydrolyzate of a titanium halide or a hydrolyzate of a titanium alkoxide with a polyhydric alcohol, or a contact product of a hydrolyzate of a mixture of a titanium halide or a titanium alkoxide and a compound (also referred to as a "compound of other element" hereinafter) of at least one element selected from the group consisting of beryllium, magnesium, calcium, strontium, barium, scandium, yttrium, lanthanum, zirconium, hafnium, vanadium, niobium, tantalum, chromium, molybdenum, tungsten, manganese, iron, ruthenium, cobalt, rhodium, nickel, palladium, copper, zinc, boron, aluminum, gallium, silicon, germanium, tin, antimony and phosphorus, with a polyhydric alcohol.

The polyhydric alcohol is preferably ethylene glycol or glycerol.

The solid titanium compound can be obtained by, for example, drying the contact product of the hydrolyzate with the polyhydric alcohol by means of a granulation dryer.

Another embodiment of the first catalyst for polyester preparation according to the invention comprises:

(I-a) the solid titanium compound, and (II) a compound of at least one element selected from the group consisting of beryllium, magnesium, calcium, strontium, barium, boron, aluminum, gallium, manganese, cobalt, zinc, germanium, antimony and phosphorus.

The second catalyst for polyester preparation according to the invention comprises a titanium-containing solution in which a contact product of a hydrolyzate of a titanium halide or a hydrolyzate of a titanium alkoxide with a polyhydric alcohol is dissolved in an ethylene glycol-containing solution in an amount of 3,000 to 100,000 ppm in terms of a titanium atom.

Another embodiment of the second catalyst for polyester preparation according to the invention comprises a titanium-containing solution in which a contact product of a hydrolyzate of a mixture of a titanium halide or a titanium alkoxide and a compound of other element, with a polyhydric alcohol is dissolved in ethylene glycol in an amount of not less than 3,000 ppm in term of a titanium atom.

The titanium-containing solution preferably has a haze of not more than 20%.

The titanium-containing solution preferably has a moisture content of 0.05 to 2.0% by weight.

The titanium-containing solution may contain a solubilizing agent, and the solubilizing agent is preferably contained in an amount of 1 to 50% by weight based on the ethylene glycol-containing solution.

The solubilizing agent is preferably glycerol or trimethylolpropane.

The titanium-containing solution may contain an acid component, and the acid component is preferably contained in an amount of 1 to 20% by weight based on the ethylene glycol-containing solution.

The acid component is preferably sulfuric acid or an organic sulfonic acid.

The ethylene glycol-containing solution may be one composed of only ethylene glycol or may be one containing a solubilizing agent, an acid component, etc., in addition to ethylene glycol.

A further embodiment of the second catalyst for polyester preparation according to the invention comprises:

(I-b) the titanium-containing solution, and (II) a compound of at least one element selected from the group consisting of beryllium, magnesium, calcium, strontium, barium, boron, aluminum, gallium, manganese, cobalt, zinc, germanium, antimony and phosphorus.

The process for preparing a polyester according to the invention comprises polycondensing a dicarboxylic acid or its ester-forming derivative with a diol or its ester-forming derivative in the presence of the first or the second catalyst for polyester preparation to produce a polyester.

The polyester prepared by the process for preparing a polyester according to the invention is preferably an aromatic polyester and is particularly preferably polyethylene terephthalate.

The polyester according to the invention is obtained by the above process for preparing a polyester.

The polyester according to the invention is preferably an aromatic polyester and is particularly preferably polyethylene terephthalate.

When the polyester according to the invention is polyethylene terephthalate, the titanium content is preferably in the range of 1 to 100 ppm and the weight ratio (Mg/Ti) of the magnesium content to the titanium content is preferably not less than 0.01.

BRIEF DESCRIPTION OF THE DRAWING

FIG. 1 is an oblique perspective view of a stepped square molded product used for measuring a haze of a polyester.

BEST MODE FOR CARRYING OUT THE INVENTION

The catalyst for polyester preparation, the process for preparing a polyester and the polyester according to the invention are described in detail hereinafter.

First Catalyst for Polyester Preparation

The first catalyst for polyester preparation according to the invention comprises a solid titanium compound containing titanium, oxygen, carbon and hydrogen and having a Ti—O bond.

It is desirable that the solid titanium compound contains titanium in an amount of 20 to 45% by weight, preferably 25 to 40% by weight, oxygen in an amount of 35 to 55% by weight, preferably 45 to 51% by weight, carbon in an amount of 1 to 30% by weight, preferably 7 to 20% by weight, and hydrogen in an amount of 1 to 15% by weight, preferably 4 to 8% by weight.

The content of titanium, etc. in the solid titanium compound can be measured by the following methods.

The titanium content can be measured by ICP analysis, and the contents of other elements can be measured by elemental analysis.

That the solid titanium compound has a Ti—O bond can be confirmed by the following method.

That is, it can be confirmed by EXAFS analysis.

When the solid titanium compound is dissolved in ethylene glycol under heating at 150° C., the maximum solubility of the solid titanium compound in ethylene glycol is not less than 3,000 ppm, preferably 3,000 to 10,000 ppm, more preferably 3,000 to 5,000 ppm, in terms of a titanium atom.

The maximum solubility of the solid titanium compound in ethylene glycol is measured in the following manner.

Only ethylene glycol is used as a solvent. The solid titanium compound is dissolved in the solvent under heating at 150° C., and a transparency of the solution is measured by a hazemeter. If it is confirmed that a haze is not more than 10%, the titanium concentration measured in this case is taken as the maximum solubility.

In the solid titanium compound, the weight ratio (Ti/C) of the titanium atom to the carbon atom is in the range of 50 to 1, preferably 25 to 2.

When the weight ratio of the titanium atom to the carbon atom is in the above range, the following effects are obtained. If the weight ratio is not more than the upper limit of the above range, the catalyst can be treated as a solid although carbon is derived from a specific liquid alcohol. If the weight ratio is not less than the lower limit of the above range, the maximum solubility in ethylene glycol becomes not less than 3,000 ppm, preferably 3,000 to 10,000 ppm.

The solid titanium compound desirably has an average particle diameter of 1 to 30 μm, preferably 1.5 to 20 μm.

The solid titanium compound may further contain an element other than titanium, oxygen, carbon and hydrogen. Such an element is at least one element selected from the group consisting of beryllium, magnesium, calcium, strontium, barium, scandium, yttrium, lanthanum, zirconium, hafnium, vanadium, niobium, tantalum, chromium, molybdenum, tungsten, manganese, iron, ruthenium, cobalt, rhodium, nickel, palladium, copper, zinc, boron, aluminum, gallium, silicon, germanium, tin, antimony and phosphorus. Of these, magnesium is preferable. Two or more of these elements may be contained in the solid titanium compound.

In the solid titanium compound containing other element, the molar ratio (E/Ti) of the other element (E) to titanium (Ti) is desired to be in the range of 1/50 to 50/1, preferably 1/40 to 40/1, more preferably 1/30 to 30/1.

As the catalyst for polyester preparation, the solid titanium compound can be used singly, or it can be used in combination with a compound (II) as described later.

Process for Preparing Solid Titanium Compound

The solid titanium compound for forming the first catalyst for polyester preparation according to the invention is obtained by, for example, dehydro-drying a contact product of a hydrolyzate of a titanium halide or a hydrolyzate of a titanium alkoxide with a polyhydric alcohol.

The solid titanium compound containing other element is obtained by, for example, dehydro-drying a contact product of a hydrolyzate of a mixture of a titanium halide or a titanium alkoxide and the compound of other element, with a polyhydric alcohol.

Examples of the compounds of other elements include hydroxides of the above-mentioned other elements, such as magnesium hydroxide. The compounds of other elements can be used singly or in combination of two or more kinds.

The titanium halide for use in the preparation of the solid titanium compound is a compound in which at least one titanium atom-halogen atom bond is present in the molecule. Examples of such compounds include titanium tetrahalides, such as titanium tetrachloride, titanium tetrabromide and titanium tetraiodide; titanium trihalides, such as titanium trichloride; titanium dihalides, such as titanium dichloride; and titanium monohalides. Examples of the titanium alkoxides include titanium tetrabutoxide and titanium tetraisopropoxide.

There is no specific limitation on the process to hydrolyze the titanium halide or the titanium alkoxide, and examples of the processes are given below.

(1) The titanium halide or the titanium alkoxide is added into water.
(2) Water is added to the titanium halide or the titanium alkoxide.
(3) A gas containing vapor of the titanium halide or the titanium alkoxide is passed through water.
(4) A gas containing water vapor is passed through the titanium halide or the titanium alkoxide.
(5) A gas containing the titanium halide or the titanium alkoxide is contacted with a gas containing water vapor.

Examples of processes to hydrolyze a mixture of the titanium halide or the titanium alkoxide and the compound of other element are given below.

(1) The titanium halide or the titanium alkoxide is added into water containing the compound of other element dissolved or suspended therein.
(2) A mixture of the titanium halide or the titanium alkoxide and the compound of other element is added to water.
(3) Water is added to a mixture of the titanium halide or the titanium alkoxide and the compound of other element.
(4) Water containing the compound of other element dissolved or suspended therein is added to the titanium halide or the titanium alkoxide.
(5) A gas containing vapor of the titanium halide or the titanium alkoxide is passed through water containing the compound of other element dissolved or suspended therein.
(6) A gas containing vapor of the titanium halide or the titanium alkoxide and vapor of the compound of other element is passed through water.
(7) A gas containing water vapor is passed through a mixture of the titanium halide or the titanium alkoxide and the compound of other element.
(8) A gas containing water vapor and vapor of the compound of other element is passed through the titanium halide or the titanium alkoxide.
(9) A gas containing the titanium halide or the titanium alkoxide is contacted with a gas containing vapor of the compound of other element and a gas containing water vapor.

In the hydrolysis, the molar ratio (E/Ti) of the other element (E) in the compound of other element to titanium (Ti) in the titanium halide or the titanium alkoxide is desired to be in the range of 1/50 to 50/1.

In the present invention, the hydrolysis process is not specifically limited as described above, but in each process, it is necessary to allow a large excess of water to act on the titanium halide or the titanium alkoxide to ensure completion of the hydrolysis. If the hydrolysis does not proceed completely and if the resulting hydrolyzate becomes such a partial hydrolyzate as described in Japanese Patent Publication No. 19477/1976, the activity of the polycondensation catalyst is sometimes insufficient.

The temperature for the hydrolysis is desired to be usually not higher than 100° C., preferably 0 to 70° C.

The hydrolyzate of the titanium halide or the hydrolyzate of the titanium alkoxide obtained by the hydrolysis is, in this stage, a gel of a hydrous hydroxide that is also called orthotitanic acid. By dehydro-drying a contact product of the hydrous hydroxide gel with a polyhydric alcohol, a solid titanium compound is obtained. The dehydro-drying is carried out in the presence of a polyhydric alcohol.

By the hydrolysis of the titanium halide, an acidic solution containing a hydrolyzate of the titanium halide is obtained, and pH of this acidic solution is usually about 1.

When the titanium halide is used as a starting material, it is desirable to adjust pH of the solution containing the hydrolyzate to 2 to 6 prior to the dehydro-drying. The pH adjustment can be made by, for example, temporarily making the solution basic by a base and then adjusting pH of the solution to 2 to 6 using an acid, or directly adjusting pH of the solution containing the hydrolyzate to 2 to 6 using a base.

There is no specific limitation on the method to temporarily make the solution basic by a base and to adjust pH of the solution to 2 to 6 using an acid. For example, the pH of the solution is temporarily adjusted to 9 to 12 by the use of ammonia, sodium hydroxide, potassium hydroxide, sodium carbonate, potassium carbonate or the like, and then the pH of the solution is adjusted to 2 to 6 by the use of acetic acid, nitric acid or the like.

There is no specific limitation also on the method to directly adjust pH of the solution containing the hydrolyzate to 2 to 6 using a base. For example, using ammonia, sodium hydroxide, potassium hydroxide, sodium carbonate, potassium carbonate or the like, the pH of the solution is adjusted to 2 to 6 at which the titanium compound is precipitated.

The temperature for the pH adjustment of the solution containing the hydrolyzate is desired to be usually not higher than 50° C., preferably not higher than 40° C. By the adjustment of pH to 2 to 6, a precipitate is formed.

When the pH of the solution containing the hydrolyzate is adjusted to 2 to 6, dehydration of the contact product of the hydrolyzate with a polyhydric alcohol can be carried out for a short period of time. Moreover, the amount of nitrogen, sodium, potassium or the like derived from the base which remains in the solid titanium compound is small, so that decrease of activity of the polycondensation catalyst or lowering of quality of a polyester prepared by the catalyst is hardly brought about.

Examples of the polyhydric alcohols to be contacted with the hydrolyzate include dihydric alcohols, such as ethylene glycol; and trihydric alcohols, such as glycerol. Of these, preferable are ethylene glycol and glycerol, and particularly preferable is ethylene glycol.

The method to dehydro-dry the contact product of the hydrolyzate with the polyhydric alcohol is, for example, a method comprising suspending the contact product in water which contains the polyhydric alcohol in an amount of 1 to 90% by weight, preferably 2 to 80% by weight, particularly preferably 5 to 50% by weight, holding the suspension for several minutes to several hours, and then conducting solid-liquid separation and dehydro-drying.

The dehydro-drying can be carried out in a state of a solid phase or a state of a suspension of the contact product in a liquid phase having a higher boiling point than water, at atmospheric pressure or under reduced pressure. Although the drying temperature is not specifically limited, it is desired to be 30° C. or more and lower than 350° C., preferably in the range of 40 to 200° C. The hydrous hydroxide gel may be washed with water prior to drying or the solid titanium compound may be washed with water after drying, to remove a water-soluble component. It is preferable to carry out the drying rapidly.

For dehydro-drying the contact product of the hydrolyzate with the polyhydric alcohol, a granulation dryer is employable. The granulation dryer is, for example, a spray dryer or a flash dryer, and preferable is a spray dryer.

The dehydro-drying using a spray dryer as the granulation dryer is carried out in, for example, the following manner. The contact product is suspended in water containing a polyhydricalcohol in an amount of 1 to 90% by weight, preferably 2 to 80% by weight, particularly preferably 5 to 50% by weight, to give a suspension having a concentration of 0.1 to 15% by weight, preferably 0.5 to 10% by weight. Then, the suspension is held for several minutes to several hours. Thereafter, the suspension is sprayed in an atmosphere of usually 80 to 250° C., preferably 120 to 200° C., whereby a solid titanium compound can be obtained.

The solid titanium compound obtained by the granulation drying is more uniform in the particle shape as compared with a solid titanium compound obtained by pulverization after drying of a cake of the contact product, so that the solid titanium compound effectively functions as a catalyst in the preparation of polyethylene terephthalate.

The width of a particle size distribution of the solid titanium compound obtained by dehydro-drying using a granulation dryer is desired to be in the range of usually 0.1 to 50 $\mu$m, preferably 0.3 to 40 $\mu$m, and the average particle diameter is desired to be in the range of usually 1 to 30 $\mu$m, preferably 1.5 to 20 $\mu$m.

By the dehydro-drying, a part of hydroxyl groups contained in the hydrous hydroxide gel are removed.

The composition of the solid titanium compound obtained as above varies depending upon the presence or absence and the amounts of the other elements in the compound, the type and the amount of the polyhydric alcohol in the compound, the type of the drying method, and the degree of drying. However, the titanium content in the solid titanium compound is in the range of usually 5 to 50% by weight in terms of a titanium atom. When the drying is so carried out that the titanium content in the solid titanium compound will be in the above range, a homogeneous solid having excellent catalytic activity is obtained.

The titanium content in the solid titanium compound can be measured by ICP analysis.

In the solid titanium compound, hydroxyl groups remain even at a temperature at which the polycondensation reaction proceeds, such as about 280° C. This indicates that the solid titanium compound is inherently different from titanium oxide that is used as a catalyst for polyester preparation in Japanese Patent Laid-Open Publication No. 156595/1975 or the like.

When a titanium halide is used as a starting material of the solid titanium compound, the chlorine content is in the range of usually 0 to 10,000 ppm, preferably 0 to 100 ppm.

Another Embodiment of the First Catalyst for Polyester Preparation

Another embodiment of the first catalyst for polyester preparation according to the invention is a catalyst comprising:

(I-a) the above-described solid titanium compound, and
(II) a compound of at least one element selected from the group consisting of beryllium, magnesium, calcium, strontium, barium, boron, aluminum, gallium, manganese, cobalt, zinc, germanium, antimony and phosphorus.

Compound (II)

The compound (II) is a compound of at least one element selected from the group consisting of beryllium, magnesium, calcium, strontium, barium, boron, aluminum, gallium, manganese, cobalt, zinc, germanium, antimony and phosphorus.

Examples of such compounds include fatty acid salts such as acetates of these elements, carbonates, sulfates, nitrates and halides (e.g., chlorides) of these elements, acetylacetonato salts of these elements, and oxides of these elements. Of these, acetates or carbonates are preferable.

The phosphorus compound is, for example, a phosphate or a phosphite of at least one metal selected from Group 1 and Group 2 of the periodic table, transition metals of the 4th period of the periodic table, zirconium, hafnium and aluminum.

More specific examples of the compounds (II) employable in the invention are described below.

Examples of the magnesium compounds include fatty acid magnesium salts, such as magnesium acetate; magnesium carbonate; magnesium chloride; and an acetylacetonato salt of magnesium. Of these, magnesium acetate or magnesium carbonate is particularly preferable.

Examples of the calcium compounds include calcium carbonate and calcium acetate.

Examples of the strontium compounds include fatty acid strontium salts, such as strontium acetate; strontium carbonate; strontium chloride; and an acetylacetonato salt of strontium. Of these, strontium acetate or strontium carbonate is particularly preferable.

Examples of the barium compounds include fatty acid barium salts, such as barium acetate; barium carbonate; barium chloride; and an acetylacetonato salt of barium. Of these, barium acetate or barium carbonate is particularly preferable.

Examples of the aluminum compounds include fatty acid aluminum salts, such as aluminum acetate; aluminum carbonate; aluminum chloride; and an acetylacetonato salt of aluminum. Of these, aluminum acetate or aluminum carbonate is particularly preferable.

Examples of the cobalt compounds include fatty acid cobalt salts, such as cobalt acetate; cobalt carbonate; cobalt chloride; and an acetylacetonato salt of cobalt. Of these, cobalt acetate or cobalt carbonate is particularly preferable.

Examples of the manganese compounds include fatty acid manganese salts, such as manganese acetate; manganese carbonate; manganese chloride; and an acetylacetonato salt of manganese. Of these, manganese acetate or manganese carbonate is particularly preferable.

Examples of the zinc compounds include fatty acid zinc salts, such as zinc acetate; zinc carbonate; zinc chloride; and an acetylacetonato salt of zinc. Of these, zinc acetate or zinc carbonate is particularly preferable.

Examples of the phosphates of the phosphorus compounds include lithium phosphate, lithium dihydrogenphosphate, dilithium hydrogenphosphate, sodium phosphate, sodium dihydrogenphosphate, disodium hydrogenphosphate, potassium phosphate, potassium dihydrogenphosphate, dipotassium hydrogenphosphate, strontium phosphate, strontium dihydrogenphosphate, distrontium hydrogenphosphate, zirconium phosphate, barium phosphate, aluminum phosphate and zinc phosphate. Of these, sodium phosphate, sodium dihydrogenphosphate, disodium hydrogenphosphate, potassium phosphate, potassium dihydrogenphosphate or dipotassium hydrogenphosphate is particularly preferably employed.

As the phosphite of the phosphorus compounds, a phosphite of at least one metal selected from alkali metals, alkaline earth metals, transition metals of the 4th period of the periodic table, zirconium, hafnium and aluminum is employed. Examples of such phosphites include lithium phosphite, sodium phosphite, potassium phosphite, strontium phosphite, zirconium phosphite, barium phosphite, aluminum phosphite and zinc phosphite. Of these, sodium phosphite or potassium phosphite is particularly preferably employed.

Of the above compounds, preferable as the compound (II) is a magnesium compound, such as magnesium carbonate or magnesium acetate; a calcium compound, such as calcium carbonate or calcium acetate; or a zinc compound, such as zinc chloride or zinc acetate. Particularly preferable is a magnesium compound.

These compounds (II) can be used singly or in combination of two or more kinds.

It is desirable to use the compound (II) in such an amount that the molar ratio (M/Ti) of the metal atom (M) in the compound (II) to titanium (Ti) in the solid titanium compound is in the range of 1/50 to 50/1, preferably 1/40 to 40/1, more preferably 1/30 to 30/1. When a phosphorus compound such as a phosphate or a phosphite is used, the above amount is in terms of a phosphorus atom contained in the phosphorus compound.

When a magnesium compound is used as the compound (II), it is also desirable to use the magnesium compound in such an amount that the molar ratio (Mg/Ti) of the magnesium atom (Mg) in the magnesium compound to titanium (Ti) in the solid titanium compound is not less than 0.01, preferably 0.06 to 10, particularly preferably 0.06 to 5. If the magnesium compound is used in this amount, the resulting polyester has excellent transparency.

Second Catalyst for Polyester Preparation

The second catalyst for polyester preparation according to the invention comprises a titanium-containing solution in which a contact product of a hydrolyzate of a titanium halide or a hydrolyzate of a titanium alkoxide with a polyhydric alcohol is dissolved in an ethylene glycol-containing solution in an amount of 3,000 to 100,000 ppm, preferably 3,000 to 80,000 ppm, more preferably 3,000 to 50,000 ppm, in terms of a titanium atom.

When the titanium content in the titanium-containing solution is in the above range, the amount of the solvent added to a polymerization reactor together with the catalyst does not become too large to affect the polymerization, and dissolving of the solid titanium compound is not difficult.

The titanium content in the titanium-containing solution can be measured by ICP analysis.

The titanium-containing solution is desired to be transparent, and the haze (sometimes referred to as "solution haze" hereinafter) of the solution, as measured by a hazemeter (ND-1001DP manufactured by Nippon Denshoku Kogyo K. K.), is desired to be not more than 20%, preferably not more than 10%. When the solution haze of the titanium-containing solution is in the above range, transparency of a polyester prepared by the use of the solution as a catalyst is not impaired.

The titanium-containing solution desirably has a moisture content of 0.04 to 3.0% by weight, preferably 0.05 to 2.0% by weight. When the moisture content is in the above range, the titanium-containing solution shows excellent transparency.

The moisture content in the titanium-containing solution is measured by a Karl Fischer's moisture meter.

The titanium-containing solution may contain a solubilizing agent. Examples of the solubilizing agents include glycerol, trimethylolpropane, propylene glycol, pentaerythritol and sorbitol. Of these, glycerol or trimethylolpropane is preferable.

The solubilizing agent is desirably contained in an amount of 1 to 50% by weight, preferably 1 to 25% by weight, based on the ethylene glycol-containing solution.

The titanium-containing solution may contain an acid component. Examples of the acid components include sulfuric acid; organic sulfonic acids, such as paratoluenesulfonic acid; and organic carboxylic acids, such as oxalic acid, acetic acid and citric acid. Of these, sulfuric acid or an organic sulfonic acid is preferable.

The acid component is desirably contained in an amount of 0.1 to 20% by weight, preferably 0.1 to 10% by weight, based on the titanium-containing solution.

As the catalyst for polyester preparation, the titanium-containing solution can be used singly, or it can be used in combination with the compound (II) as described later.

Process for Preparing Titanium-Containing Solution

The titanium-containing solution for the invention is obtained by, for example, dissolving the aforesaid solid titanium compound in ethylene glycol or in ethylene glycol and other component.

To dissolve the solid titanium compound in ethylene glycol, heating is preferable, and the heating temperature is in the range of usually 120 to 200° C., preferably 140 to 195° C.

In the present invention, the aforesaid solubilizing agent and/or acid component can be used if necessary when the solid titanium compound is dissolved in ethylene glycol.

The solubilizing agent is used in such an amount that the content thereof based on the ethylene glycol-containing solution amounts to 1 to 50% by weight, preferably 1 to 25% by weight, and the acid component is used in such an amount that the content thereof based on the ethylene glycol-containing solution amounts to 0.1 to 20% by weight, preferably 0.1 to 10% by weight.

The titanium-containing solution can also be obtained by dissolving, in ethylene glycol, a solid titanium-containing compound which is obtained by dehydro-drying a contact product of a mixture of a hydrolyzate of a titanium halide or a hydrolyzate of a titanium alkoxide and a hydrolyzate of a compound of other element, with a polyhydric alcohol.

The hydrolyzate of a titanium halide and the hydrolyzate of a titanium alkoxide are the same hydrolyzates as used for preparing the aforesaid solid titanium compound.

The compound of other element is the same compound of other element as used for preparing the aforesaid solid titanium compound. The compound of other element can be used singly or in combination of two or more kinds.

There is no specific limitation on the method to hydrolyze the compound of other element. For example, hydrolysis of the compound of other element can be carried out in the same manner as in the aforesaid method to prepare a hydrolyzate of the titanium halide or a hydrolyzate of the titanium alkoxide, except that the compound of other element is used instead of the titanium halide or the titanium alkoxide. By the hydrolysis of the compound of other element, a solution containing the hydrolyzate is obtained.

The mixture of a hydrolyzate of a titanium halide or a hydrolyzate of a titanium alkoxide and a hydrolyzate of a compound of other element can be prepared by separately forming the hydrolyzates in the aforesaid manner and then mixing them.

It is preferable to mix the hydrolyzate of the titanium halide or the hydrolyzate of the titanium alkoxide with the hydrolyzate of the compound of other element in such a manner that the molar ratio (E/Ti) of other element (E) in the hydrolyzate of the compound of other element to titanium (Ti) in the hydrolyzate of the titanium halide or the hydrolyzate of the titanium alkoxide may be in the range of 1/50 to 50/1.

The solid titanium-containing compound can be obtained by dehydro-drying a contact product of the mixture with a polyhydric alcohol similarly to the aforesaid process for preparing a solid titanium compound.

The solid titanium-containing compound obtained as above preferably has a particle diameter of 1 to 30 μm.

The composition of the solid titanium-containing compound varies depending upon the amount of the other element, the type and the amount of the polyhydric alcohol, the type of the drying method, and the degree of drying. However, the titanium content in the solid titanium-containing compound is in the range of usually 5 to 50% by weight. When the drying is so carried out that the titanium content in the solid titanium-containing compound may be in the above range, a homogeneous solid having excellent catalytic activity is obtained.

In the solid titanium-containing compound, the molar ratio (E/Ti) of the other element (E) to titanium (Ti) is desired to be in the range of 1/50 to 50/1, preferably 1/40 to 40/1, more preferably 1/30 to 30/1.

When a titanium halide is used as a starting material, the chlorine content in the solid titanium-containing compound is in the range of usually 0 to 10,000 ppm, preferably 0 to 100 ppm.

Subsequently, the solid titanium-containing compound is dissolved in an ethylene glycol-containing solution similarly to the aforesaid manner, whereby the titanium-containing solution is obtained.

Another Embodiment of the Second Catalyst for Polyester Preparation

Another embodiment of the second catalyst for polyester preparation according to the invention is a catalyst comprising:

(I-b) the above-mentioned titanium-containing solution, and (II) a compound of at least one element selected from the group consisting of beryllium, magnesium, calcium, strontium, barium, boron, aluminum, gallium, manganese, cobalt, zinc, germanium, antimony and phosphorus.

As the compound (II), the aforesaid one is used. The compound (II) can be used singly or in combination of two or more kinds.

It is desirable to use the compound (II) in such an amount that the molar ratio (M/Ti) of the metal atom (M) in the compound (II) to titanium (Ti) in the titanium-containing solution (I-b) is in the range of 1/50 to 50/1, preferably 1/40 to 40/1, more preferably 1/30 to 30/1. When a phosphorus compound such as a phosphate or a phosphite is used, the above amount is in terms of a metal atom contained in the phosphorus compound.

When a magnesium compound is used as the compound (II), it is also desirable to use the magnesium compound in such an amount that the weight ratio (Mg/Ti) of the magnesium atom (Mg) in the magnesium compound to titanium (Ti) in the titanium-containing solution (I-b) is not less than 0.01, preferably 0.06 to 10, particularly preferably 0.06 to 5. If the magnesium compound is used in this amount, the resulting polyester has excellent transparency.

Process for Preparing Polyester

The process for preparing a polyester according to the invention comprises polycondensing a dicarboxylic acid or its ester-forming derivative and a diol or its ester-forming derivative in the presence of the first or the second catalyst for polyester preparation to prepare a polyester. One example of the process is described below.

Materials to be Used

In the process for preparing a polyester according to the invention, a dicarboxylic acid or its ester-forming derivative and a diol or its ester-forming derivative, preferably an aromatic dicarboxylic acid or its ester-forming derivative and an aliphatic diol or its ester-forming derivative, are used as starting materials.

Examples of the dicarboxylic acids employable in the invention include aromatic dicarboxylic acids, such as terephthalic acid, phthalic acid, isophthalic acid, naphthalenedicarboxylic acid, diphenyldicarboxylic acid and diphenoxyethanedicarboxylic acid; aliphatic dicarboxylic acids, such as adipic acid, sebacic acid, azelaic acid and decanedicarboxylic acid; and alicyclic dicarboxylic acids, such as cyclohexanedicarboxylic acid. Of the dicarboxylic acids, preferable are aromatic dicarboxylic acids, and particularly preferable is terephthalic acid.

Examples of the diols include aliphatic glycols, such as ethylene glycol, trimethylene glycol, propylene glycol, tetramethylene glycol, neopentyl glycol, hexamethylene glycol and dodecamethylene glycol; alicyclic glycols, such as cyclohexane dimethanol; and aromaticdiols, such as bisphenols, hydroquinone and 2,2-bis(4-β-hydroxyethoxyphenyl)propane. Of the diols, preferable are aliphatic glycols, and particularly preferable is ethylene glycol.

In the present invention, a polyfunctional compound, such as trimesic acid, trimethylolethane, trimethylolpropane, trimethylolmethane or pentaerythritol, is employable as a starting material.

Esterification Step

In the process for preparing a polyester, first, a dicarboxylic acid or its ester-forming derivative and a diol or its ester-forming derivative are esterified.

More specifically, a slurry containing a dicarboxylic acid or its ester-forming derivative and a diol or its ester-forming derivative is prepared.

In the slurry, the diol or its ester-forming derivative is contained in an amount of usually 1.005 to 1.4 mol, preferably 1.01 to 1.3 mol, based on 1 mol of the dicarboxylic acid or its ester-forming derivative. The slurry is continuously fed to the esterification reaction step.

The esterification reaction is preferably carried out under reflux of ethylene glycol using a device consisting of two or more esterification reactors connected in series, while water produced by the reaction is removed from the system by means of a fractionating column.

The esterification reaction is generally carried out in plural steps. The first step of the esterification reaction is usually performed under the conditions of a reaction temperature of 240 to 270° C., preferably 245 to 265° C., and a pressure of 0.02 to 0.3 MPaG (0.2 to 3 kg/cm$^2$G), preferably 0.05 to 0.2 MPaG (0.5 to 2 kg/cm$^2$G), and the last step of the esterification reaction is usually performed under the conditions of a reaction temperature of 250 to 280° C., preferably 255 to 275° C., and a pressure of 0 to 0.15 MPaG (0 to 1.5 kg/cm$^2$G), preferably 0 to 0.13 MPaG (0 to 1.3 kg/cm$^2$G).

When the esterification reaction is carried out in two steps, the esterification reaction conditions of the first and the second steps are respectively as described above. When the esterification reaction is carried out in three or more steps, the esterification reaction conditions of the second step to the last step but one have only to be conditions between the conditions of the first step and the conditions of the last step described above.

For example, when the esterification reaction is carried out in three steps, the reaction temperature of the esterification reaction of the second step has only to be in the range of usually 245 to 275° C., preferably 250 to 270° C., and the pressure thereof has only to be in the range of usually 0 to 0.2 MPaG (0 to 2 kg/cm$^2$G), preferably 0.02 to 0.15 MPaG (0.2 to 1.5 kg/cm$^2$G).

Although there is no specific limitation on the esterification conversion in each step, it is preferable that the degree of increase of the esterification conversion is smoothly distributed in the steps, and the conversion in the esterification reaction product of the last step desirably reaches usually not less than 90%, preferably not less than 93%.

Through the esterification steps, an esterification reaction product (low condensate) is obtained, and the number-average molecular weight of the low condensate is in the range of about 500 to 5,000.

The low condensate obtained through the esterification steps mentioned above is then fed to the polycondensation (liquid phase polycondensation) step.

Liquid Phase Polycondensation Step

In the liquid phase polycondensation step, the low condensate obtained through the esterification step is polycondensed under heating at a temperature of not lower than the melting point of a polyester, usually at 250 to 280° C., under reduced pressure in the presence of the aforesaid catalyst for polyester preparation. The polycondensation reaction is desirably carried out with distilling off the unreacted diol from the reaction system.

The polycondensation reaction may be carried out in one step, or may be carried out in plural steps. For example, when the polycondensation reaction is carried out in plural steps, the first step of the polycondensation reaction is performed under the conditions of a reaction temperature of 250 to 290° C., preferably 260 to 280° C., and a pressure of 0.07 to 0.003 MPaG (500 to 20 Torr), preferably 0.03 to 0.004 MPaG (200 to 30 Torr), and the last step of the polycondensation reaction is performed under the conditions of a reaction temperature of 265 to 300° C., preferably 270 to 295° C., and a pressure of 1 to 0.01 kPaG (10 to 0.1 Torr), preferably 0.7 to 0.07 kPaG (5 to 0.5 Torr).

When the polycondensation reaction is carried out in three or more steps, the polycondensation reaction conditions of the second step to the last step but one are conditions between the conditions of the first step and the conditions of the last step described above. For example, when the polycondensation reaction is carried out in three steps, the polycondensation reaction of the second step is performed under the conditions of a reaction temperature of 260 to 295° C., preferably 270 to 285° C., and a pressure of 7 to 0.3 kPaG (50 to 2 Torr), preferably 5 to 0.7 kPaG (40 to 5 Torr).

In the polycondensation reaction, it is desirable to use the solid titanium compound or the titanium-containing solution in an amount of 0.001 to 0.2% by mol, preferably 0.002 to 0.1% by mol, in terms of a titanium atom, based on the dicarboxylic acid units in the low condensate.

If the compound (II) is further used in addition to the solid titanium compound or the titanium-containing solution, it is desirable to use the compound (II) in an amount of 0.001 to 0.5% by mol, preferably 0.002 to 0.3% by mol, in terms of a metal atom, based on the dicarboxylic acid units in the low condensate.

The catalyst comprising the solid titanium compound or the titanium-containing solution and optionally the compound (II) has only to be present during the polycondensation reaction. Therefore, the catalyst may be added in any step of the starting slurry preparation step, the esterification step and the liquid phase polycondensation step. The catalyst may be added in the whole amount at once, or may be added by portions in plural times. If the compound (II) is used in combination, it may be added in the same step as that for adding the solid titanium compound or the titanium-containing solution or in the different step.

The polycondensation reaction is desirably carried out in the presence of a stabilizer.

The stabilizer is specifically a phosphorus compound. Examples of the phosphorus compounds include phosphates, such as trimethyl phosphate, triethyl phosphate, tri-n-butyl phosphate, trioctyl phosphate and triphenyl phosphate; phosphorous esters, such as triphenyl phosphite, trisdodecyl phosphite and trisnonylphenyl phosphite; phosphoric esters, such as methyl acid phosphate, ethyl acid phosphate, isopropyl acid phosphate, butyl acid phosphate, dibutyl phosphate, monobutyl phosphate and dioctyl phosphate; phosphoric acid; and polyphosphoric acid.

The amount of the phosphorus compound added is desired to be in the range of 0.005 to 0.2% by mol, preferably 0.01 to 0.1% by mol, in terms of a phosphorus atom in the phosphorus compound, based on the dicarboxylic acid.

The intrinsic viscosity (IV) of a polyester obtained by the liquid phase polycondensation mentioned above is desired to be in the range of 0.40 to 1.0 dl/g, preferably 0.50 to 0.90 dl/g. Although the intrinsic viscosity obtained in each step of the liquid phase polycondensation steps except the last step is not specifically restricted, it is desirable that the degree of increase of the intrinsic viscosity is smoothly distributed in those steps.

In the present specification, the intrinsic viscosity (IV) is determined as follows. A polyester of 1.2 g is dissolved in 15 cc of o-chlorophenol by heating, then the solution is cooled, and a solution viscosity is measured at 25° C. From the solution viscosity, the intrinsic viscosity is calculated.

The polyester obtained through the polycondensation steps is usually melt extruded to form particles (chips).

Solid Phase Polycondensation Step

The polyester obtained through the liquid phase polycondensation steps can be further subjected to solid phase polycondensation, if desired.

The particulate polyester to be fed to the solid phase polycondensation step may be precrystallized by heating at a temperature of lower than the solid phase polycondensation temperature, followed by feeding it to the solid phase polycondensation step.

The precrystallization can be achieved by heating the particulate polyester in a dry state at a temperature of usually 120 to 200° C., preferably 130 to 180° C., for a period of 1 minute to 4 hours. The precrystallization can also be achieved by heating the particulate polyester at a temperature of 120 to 200° C. for a period of not shorter than 1 minute in an atmosphere of water vapor, an atmosphere of a water vapor-containing inert gas or an atmosphere of water vapor-containing air.

The thus precrystallized polyester desirably has a crystallinity of 20 to 50%.

The so-called solid polycondensation reaction of a polyester is not promoted by the precrystallization, and the intrinsic viscosity of the precrystallized polyester is almost the same as that of the polyester after the liquid phase polycondensation. The difference between the intrinsic viscosity of the precrystallized polyester and the intrinsic viscosity of the polyester before the precrystallization is usually not more than 0.06 dl/g.

The solid phase polycondensation consists of at least one step and is carried out under the conditions of a temperature of 190 to 230° C., preferably 195 to 225° C., and a pressure of 98 to 0.001 MPaG (1 kg/cm$^2$G to 10 Torr), preferably atmospheric pressure to 0.01 MPaG (100 Torr), in an atmosphere of an inert gas such as a nitrogen gas, an argon gas or a carbonic acid gas. As the inert gas, a nitrogen gas is preferably employed.

The particulate polyester obtained through the solid phase polycondensation step may be subjected to a water treatment using, for example, a method described in Japanese Patent Publication No. 64920/1995. The water treatment is carried out by contacting the particulate polyester with water, water vapor, water vapor-containing inert gas or water vapor-containing air, or the like.

The intrinsic viscosity (IV) of the particulate polyester obtained as above is desired to be in the range of usually 0.60 to 1.00 dl/g, preferably 0.75 to 0.95 dl/g.

The polyester preparation process including the esterification step and the polycondensation step can be carried out by batchwise, semi-continuously or continuously.

The catalyst for polyester preparation according to the invention, particularly the catalyst comprising the solid titanium compound (I-a) or the titanium-containing solution (I-b) and the compound (II) that is a magnesium compound, is preferable as a catalyst for preparing polyethylene terephthalate. In order to prepare polyethylene terephthalate using the polyester preparation catalyst comprising the solid titanium compound (I-a) or the titanium-containing solution (I-b) and a magnesium compound, terephthalic acid or its ester-forming derivative and ethylene glycol or its ester-forming derivative, and optionally, an aromatic dicarboxylic acid other than terephthalic acid and/or an aliphatic diol other than ethylene glycol are used as starting materials, and they are subjected to the esterification, the liquid phase polycondensation, and if desired, the solid phase polycondensation.

In the above process, terephthalic acid or its ester-forming derivative is used in an amount of not less than 80% by mol, preferably not less than 90% by mol, based on 100% by mol of the aromatic dicarboxylic acid, and ethylene glycol or its ester-forming derivative is used in an amount of not less than 80% by mol, preferably not less than 90% by mol, based on 100% by mol of the aliphatic diol.

In the polyethylene terephthalate obtained as above, the titanium content is preferably in the range of 1 to 200 ppm, particularly 1 to 100 ppm, and the magnesium content is preferably in the range of 1 to 200 ppm, particularly 1 to 100 ppm. The weight ratio (Mg/Ti) of magnesium to titanium contained in the polyethylene terephthalate is desired to be not less than 0.01, preferably in the range of 0.06 to 10, particularly preferably 0.06 to 5. The chlorine content in the polyethylene terephthalate is in the range of 0 to 1,000 ppm, preferably 0 to 100 ppm.

The polyethylene terephthalate shows excellent hue and particularly excellent transparency and has a low content of acetaldehyde, so that the polyethylene terephthalate is particularly preferably used for bottles.

To the polyester prepared as above, hitherto known additives, such as stabilizer, release agent, antistatic agent, dispersant and colorant (e.g., pigment), may be added. These additives may be added in any step of the polyester preparation process, and may be added as a masterbatch prior to the molding.

Uses of Polyester

The polyester obtained by the invention can be used as a material of various molded products. For example, the polyester is melt molded to produce blow molded products (e.g., bottles), sheets, films, fibers and the like, and in particular, the polyester is preferably used for bottles.

To produce bottles, sheets, films, fibers or the like from the polyester obtained by the invention such as polyethylene terephthalate, hitherto known processes are adoptable.

For example, a bottle is produced by a process comprising extruding the polyester such as polyethylene terephthalate from a die in a molten state to form a tubular parison, holding the parison in a mold of desired shape and then blowing air into the parison to fit the parison into the mold and thereby produce a blow molded product, or a process comprising injection molding the polyester such as polyethylene terephthalate to form a preform, heating the preform to the stretch suitable temperature, holding the preform in a mold of desired shape and then blowing air into the preform to fit the preform into the mold and thereby produce a blow molded product.

EFFECT OF THE INVENTION

The catalyst for polyester preparation according to the invention can prepare a polyester with a higher catalytic activity than a germanium compound or an antimony compound which has been hitherto used as a polycondensation catalyst. According to the process of the invention, a polyester having better transparency and hue and having lower acetaldehyde content can be obtained as compared with a process using an antimony compound as a polycondensation catalyst.

EXAMPLES

The present invention is further described with reference to the following examples, but it should be construed that the invention is in no way limited to those examples.

Example 1

Preparation of Solid Titanium Compound

Deionized water of 500 ml was weighed into a 1000 ml glass beaker and cooled in an ice bath, followed by dropwise adding 5 g of titanium tetrachloride with stirring. When generation of hydrogen chloride stopped, the beaker was taken out of the ice bath, and 25% aqueous ammonia was dropwise added at room temperature with stirring to adjust pH of the liquid to 9. To the liquid, a 15% acetic acid aqueous solution was dropwise added at room temperature with stirring to adjust pH of the liquid to 5. The precipitate formed was separated by filtration. The precipitate was washed 5 times with deionized water. After washing, the precipitate was immersed in 10 wt % ethylene glycol-containing water for 30 minutes, and then solid-liquid separation was carried out by filtration similarly to the washing. After washing, the resulting titanium compound was subjected to vacuum drying at 40° C. and 1.3 kPa (10 Torr) for 20 hours to remove moisture, whereby a solid titanium compound (a1) was obtained.

The solid titanium compound (a1) thus obtained was powdered into particles of about 10 μm prior to use as a polycondensation catalyst.

The titanium content (in terms of titanium atom, measured by ICP analysis, the same shall apply herein after) in the solid titanium compound (a1) was 35.4% by weight. It was confirmed by elemental analysis and EXAFS analysis that the solid titanium compound (a1) contained titanium, oxygen, carbon and hydrogen and had a Ti—O bond. The maximum solubility of the solid titanium compound (a1) in ethylene glycol was 3,000 ppm, and the weight ratio (Ti/C) of titanium to carbon was 3.

Example 2

Preparation of Solid Titanium Compound

Deionized water of 500 ml was weighed into a 1,000 ml glass beaker and cooled in an ice bath, followed by dropwise adding 5 g of titanium tetrachloride with stirring. When generation of hydrogen chloride stopped, the beaker was taken out of the ice bath, and 25% aqueous ammonia was dropwise added at room temperature with stirring to adjust pH of the liquid to 9. To the liquid, a 15% acetic acid aqueous solution was dropwise added at room temperature with stirring to adjust pH of the liquid to 5. The precipitate formed was separated by filtration. The precipitate was washed 5 times with deionized water. After washing, the precipitate was immersed in 30 wt % ethylene glycol-containing water for 30 minutes, and then solid-liquid separation was carried out by filtration similarly to the washing. After washing, the resulting titanium compound was subjected to vacuum drying at 40° C. and 1.3 kPa (10 Torr) for 40 hours to remove moisture, whereby a solid titanium compound (a2) was obtained.

The solid titanium compound (a2) thus obtained was powdered into particles of about 10 μm prior to use as a polycondensation catalyst.

The titanium content in the solid titanium compound (a2) was 23.6% by weight. It was confirmed by elemental analysis and EXAFS analysis that the solid titanium compound (a2) contained titanium, oxygen, carbon and hydrogen and had a Ti—O bond. The maximum solubility of the solid titanium compound (a2) in ethylene glycol was 4,500 ppm, and the weight ratio (Ti/C) of titanium to carbon was 2.5.

Example 3

Preparation of Solid Titanium Compound

Deionized water of 500 ml was weighed into a 1,000 ml glass beaker and cooled in an ice bath, followed by dropwise adding 5 g of titanium tetrachloride with stirring. When generation of hydrogen chloride stopped, the beaker was taken out of the ice bath, and 25% aqueous ammonia was dropwise added at room temperature with stirring to adjust pH of the liquid to 9. To the liquid, a 15% acetic acid aqueous solution was dropwise added at room temperature with stirring to adjust pH of the liquid to 5. The precipitate formed was separated by filtration. The precipitate was washed 5 times with deionized water. After washing, the precipitate was immersed in 50 wt % ethylene glycol-containing water for 30 minutes, and then solid-liquid separation was carried out by filtration similarly to the washing. After washing, the resulting titanium compound was subjected to vacuum drying at 40° C. and 1.3 kPa (10 Torr) for 150 hours to remove moisture, whereby a solid titanium compound (a3) was obtained.

The solid titanium compound (a3) thus obtained was powdered into particles of about 10 μm prior to use as a polycondensation catalyst.

The titanium content in the solid titanium compound (a3) was 19.9% by weight. It was confirmed by elemental analysis and EXAFS analysis that the solid titanium compound (a3) contained titanium, oxygen, carbon and hydrogen and had a Ti—O bond. The maximum solubility of the solid titanium compound (a3) in ethylene glycol was 5,000 ppm, and the weight ratio (Ti/C) of titanium to carbon was 2.

Example 4

Preparation of Solid Titanium Compound

Deionized water of 500 ml was weighed into a 1,000 ml glass beaker and cooled in an ice bath, followed by dropwise adding 5 g of titanium tetrachloride with stirring. When generation of hydrogen chloride stopped, the beaker was taken out of the ice bath, and 25% aqueous ammonia was dropwise added at room temperature with stirring to adjust pH of the liquid to 5. The precipitate formed was separated by filtration. The precipitate was washed 5 times with deionized water. After washing, the precipitate was immersed in 10 wt % ethylene glycol-containing water for 30 minutes, and then solid-liquid separation was carried out by filtration similarly to the washing. After washing, the resulting titanium compound was subjected to vacuum drying at 40° C. and 1.3 kPa (10 Torr) for 20 hours to remove moisture, whereby a solid titanium compound (a4) was obtained.

The solid titanium compound (a4) thus obtained was powdered into particles of about 10 μm prior to use as a polycondensation catalyst.

The titanium content in the solid titanium compound (a4) was 34.6% by weight. It was confirmed by elemental analysis and EXAFS analysis that the solid titanium compound (a4) contained titanium, oxygen, carbon and hydrogen and had a Ti—O bond. The maximum solubility of the solid titanium compound (a4) in ethylene glycol was 3,000 ppm, and the weight ratio (Ti/C) of titanium to carbon was 3.

Example 5

Preparation of Solid Titanium Compound

Deionized water of 500 ml was weighed into a 1,000 ml glass beaker and cooled in an ice bath, followed by dropwise adding 5 g of titanium tetrachloride with stirring. When generation of hydrogen chloride stopped, the beaker was taken out of the ice bath, and 25% aqueous ammonia was dropwise added at room temperature with stirring to adjust pH of the liquid to 5. The precipitate formed was separated by filtration. The precipitate was washed 5 times with deionized water. After washing, the precipitate was immersed in 30 wt % ethylene glycol-containing water for 30 minutes, and then solid-liquid separation was carried out by filtration similarly to the washing. After washing, the resulting titanium compound was subjected to vacuum drying at 40° C. and 1.3 kPa (10 Torr) for 40 hours to remove moisture, whereby a solid titanium compound (a5) was obtained.

The solid titanium compound (a5) thus obtained was powdered into particles of about 10 μm prior to use as a polycondensation catalyst.

The titanium content in the solid titanium compound (a5) was 24.3% by weight. It was confirmed by elemental analysis and EXAFS analysis that the solid titanium compound (a5) contained titanium, oxygen, carbon and hydrogen and had a Ti—O bond. The maximum solubility of the solid titanium compound (a5) in ethylene glycol was 4,500 ppm, and the weight ratio (Ti/C) of titanium to carbon was 2.5.

Example 6

Preparation of Solid Titanium Compound

Deionized water of 500 ml was weighed into a 1,000 ml glass beaker and cooled in an ice bath, followed by dropwise adding 7.5 g of titanium tetraisopropoxide with stirring. After the dropwise addition was completed, the liquid was stirred for 30 minutes at room temperature. After the stirring was completed, the precipitate formed was separated by filtration. The precipitate was washed 5 times with deionized water. The precipitate was immersed in 10 wt % ethylene glycol-containing water for 30 minutes, and then solid-liquid separation was carried out by filtration similarly to the washing. After washing, the resulting titanium compound was subjected to vacuum drying at 40° C. and 1.3 kPa (10 Torr) for 20 hours to remove moisture, whereby a solid titanium compound (a6) was obtained.

The solid titanium compound (a6) thus obtained was powdered into particles of about 10 μm prior to use as a polycondensation catalyst.

The titanium content in the solid titanium compound (a6) was 36.3% by weight. It was confirmed by elemental analysis and EXAFS analysis that the solid titanium compound (a6) contained titanium, oxygen, carbon and hydrogen and had a Ti—O bond. The maximum solubility of the solid titanium compound (a6) in ethylene glycol was 3,000 ppm, and the weight ratio (Ti/C) of titanium to carbon was 3.

Comparative Example 1

Preparation of Solid Titanium Compound

Deionized water of 500 ml was weighed into a 1,000 ml glass beaker and cooled in an ice bath, followed by dropwise adding 5 g of titanium tetrachloride with stirring. When generation of hydrogen chloride stopped, the beaker was taken out of the ice bath, and 25% aqueous ammonia was dropwise added at room temperature with stirring to adjust pH of the liquid to 9. To the liquid, a 15% acetic acid aqueous solution was dropwise added at room temperature with stirring to adjust pH of the liquid to 5. The precipitate formed was separated by filtration. The precipitate was washed 5 times with deionized water. After washing, solid-liquid separation was carried out by filtration similarly to the above. After washing, the resulting titanium compound was subjected to vacuum drying at 40° C. and 1.3 kPa (10 Torr) for 20 hours to remove moisture, whereby a solid titanium compound (c1) was obtained.

The solid titanium compound (c1) thus obtained was powdered into particles of about 10 μm prior to use as a polycondensation catalyst.

The titanium content in the solid titanium compound (c1) was 50.7% by weight. It was confirmed by elemental analysis and EXAFS analysis that the solid titanium compound (c1) contained titanium, oxygen and hydrogen and had a Ti—O bond. It could not be confirmed that the solid titanium compound (c1) contained carbon. The maximum solubility of the solid titanium compound (c1) in ethylene glycol was 500 ppm.

Example 7

Preparation of Solid Titanium Compound

Deionized water of 500 ml was weighed into a 1,000 ml glass beaker. Then, 0.15 g of anhydrous magnesium hydroxide was added to the water and dispersed therein. The resulting suspension was cooled in an ice bath, followed by dropwise adding 5 g of titanium tetrachloride with stirring. With the dropwise addition, the liquid became acidic, and the dispersed magnesium hydroxide was dissolved. When generation of hydrogen chloride stopped, the beaker was taken out of the ice bath, and 25% aqueous ammonia was dropwise added at room temperature with stirring to adjust pH of the liquid to 9. To the liquid, a 15% acetic acid aqueous solution was dropwise added at room temperature with stirring to adjust pH of the liquid to 5. The precipitate of titanium-containing complex hydroxide formed was separated by filtration. The precipitate was washed 5 times with deionized water. After washing, the precipitate was immersed in 10 wt % ethylene glycol-containing water for 30 minutes, and then solid-liquid separation was carried out by filtration similarly to the washing. After washing, the resulting titanium-containing complex hydroxide was subjected to vacuum drying at 40° C. and 1.3 kPa (10 Torr) for 20 hours to remove moisture, whereby a solid titanium compound (a7) was obtained.

The solid titanium compound (a7) thus obtained was powdered into particles of about 10 μm prior to use as a polycondensation catalyst.

The titanium content in the solid titanium compound (a7) was 33.4% by weight, and the magnesium content (in terms of magnesium atom, the same shall apply hereinafter) therein was 3.2% by weight. It was confirmed by elemental analysis and EXAFS analysis that the solid titanium compound (a7) contained titanium, oxygen, carbon and hydrogen and had a Ti—O bond. The maximum solubility of the solid titanium compound (a7) in ethylene glycol was 3,000 ppm, and the weight ratio (Ti/C) of titanium to carbon was 3.

Example 8

Preparation of Polyester

To a reactor in which 33,500 parts by weight of a reaction solution was resident (also in the steady operation, the same amount of a reaction solution is resident), a slurry prepared by mixing 6, 458 parts by weight/hr of high-purity terephthalic acid with 2,615 part by weight/hr of ethylene glycol was continuously fed, and esterification reaction was carried out in a nitrogen atmosphere under the conditions maintained at 260° C. and 0.09 MPaG (0.9 kg/cm$^2$G). In the esterification reaction, a mixed liquid of water and ethylene glycol was distilled off.

The esterification reaction product (low condensate) was continuously drawn out of the system so as to control the mean residence time of the esterification reaction product to be 3.5 hours.

The number-average molecular weight of the low condensate of ethylene glycol and terephthalic acid obtained above was in the range of 600 to 1,300 (trimer to pentamer).

Then, liquid phase polycondensation reaction of the low condensate was carried out using the solid titanium compound (a1) prepared in Example 1 and magnesium acetate as polycondensation catalysts.

The catalytic amount of the solid titanium compound (a1) was 0.008% by mol in terms of a titanium atom and the catalytic amount of magnesium acetate was 0.015% by mol in terms of a magnesium atom, based on the terephthalic acid units in the low condensate. As a stabilizer, tributyl phosphate was added in an amount of 0.020% by mol in terms of a phosphorus atom. The polycondensation reaction was conducted under the conditions of 280° C. and 1 Torr.

The period of time (liquid phase polycondensation time) required for reaching of a polyethylene terephthalate intrinsic viscosity (IV) of 0.68 dl/g was 115 minutes.

The titanium content in the polyethylene terephthalate was 18 ppm, and the weight ratio (Mg/Ti) of the magnesium content to the titanium content was 1.

Example 9

Preparation of Polyester

Polycondensation reaction was carried out in the same manner as in Example 8, except that the solid titanium compound (a2) prepared in Example 2 was used as the polycondensation catalyst.

The period of time (liquid phase polycondensation time) required for reaching of a polyethylene terephthalate intrinsic viscosity (IV) of 0.68 dl/g was 107 minutes.

The titanium content in the polyethylene terephthalate was 18 ppm, and the weight ratio (Mg/Ti) of the magnesium content to the titanium content was 1.

Example 10

Preparation of Polyester

Polycondensation reaction was carried out in the same manner as in Example 8, except that the solid titanium compound (a3) prepared in Example 3 was used as the polycondensation catalyst.

The period of time (liquid phase polycondensation time) required for reaching of a polyethylene terephthalate intrinsic viscosity (IV) of 0.68 dl/g was 99 minutes.

The titanium content in the polyethylene terephthalate was 18 ppm, and the weight ratio (Mg/Ti) of the magnesium content to the titanium content was 1.

Example 11

Preparation of Polyester

Polycondensation reaction was carried out in the same manner as in Example 8, except that the solid titanium compound (a4) prepared in Example 4 was used as the polycondensation catalyst.

The period of time (liquid phase polycondensation time) required for reaching of a polyethylene terephthalate intrinsic viscosity (IV) of 0.68 dl/g was 117 minutes.

The titanium content in the polyethylene terephthalate was 18 ppm, and the weight ratio (Mg/Ti) of the magnesium content to the titanium content was 1.

Example 12

Preparation of Polyester

Polycondensation reaction was carried out in the same manner as in Example 8, except that the solid titanium compound (a5) prepared in Example 5 was used as the polycondensation catalyst.

The period of time (liquid phase polycondensation time) required for reaching of a polyethylene terephthalate intrinsic viscosity (IV) of 0.68 dl/g was 108 minutes.

The titanium content in the polyethylene terephthalate was 18 ppm, and the weight ratio (Mg/Ti) of the magnesium content to the titanium content was 1.

Example 13

Preparation of Polyester

Polycondensation reaction was carried out in the same manner as in Example 8, except that the solid titanium compound (a6) prepared in Example 6 was used as the polycondensation catalyst.

The period of time (liquid phase polycondensation time) required for reaching of a polyethylene terephthalate intrinsic viscosity (IV) of 0.68 dl/g was 120 minutes.

The titanium content in the polyethylene terephthalate was 18 ppm, and the weight ratio (Mg/Ti) of the magnesium content to the titanium content was 1.

Example 14

Preparation of Polyester

Polycondensation reaction was carried out in the same manner as in Example 8, except that the solid titanium compound (a7) prepared in Example 7 was used as the polycondensation catalyst.

The period of time (liquid phase polycondensation time) required for reaching of a polyethylene terephthalate intrinsic viscosity (IV) of 0.68 dl/g was 117 minutes.

The titanium content in the polyethylene terephthalate was 18 ppm, and the weight ratio (Mg/Ti) of the magnesium content to the titanium content was 1.

Comparative Example 2

Preparation of Polyester

Polycondensation reaction was carried out in the same manner as in Example 8, except that the solid titanium compound (cl) prepared in Comparative Example 1 was used as the 10 polycondensation catalyst.

The period of time (liquid phase polycondensation time) required for reaching of a polyethylene terephthalate intrinsic viscosity (IV) of 0.68 dl/g was 140 minutes.

Comparative Example 3

Preparation of Polyester

Polycondensation reaction was carried out in the same manner as in Example 8, except that antimony acetate industrially used as a polycondensation catalyst was used. The amount of the antimony acetate added was 0.025% by mol in terms of antimony based on the terephthalic acid units in the low condensate.

The period of time (liquid phase polycondensation time) required for reaching of a polyethylene terephthalate intrinsic viscosity (IV) of 0.68 dl/g was 164 minutes.

Measurements of Acetaldehyde Content and Haze after Solid Phase Polymerization

After the liquid phase polycondensation, chips of the polyethylene terephthalate prepared in each of Examples 8 to 14 and Comparative Examples 2 and 3 were precrystallized at 170° C. for 2 hours and then heated at 210° C. in an atmosphere of a nitrogen gas, to conduct solid phase polymerization until the intrinsic viscosity (IV) became 0.84 dl/g from 0.68 dl/g and thereby increase the molecular weight. The acetaldehyde content in each polyethylene terephthalate after the solid phase polymerization is set forth in Table 1.

The acetaldehyde content was determined as follows. A sample of 2 g was cooled and pulverized, followed by returning the temperature to room temperature. Then, 1 g of the sample was collected and placed in a container. To the container, 2 cc of an internal standard liquid was added, and the container was tightly closed. Subsequently, extraction was carried out for 1 hour in an oven at 120° C., followed by cooling. Then, using 5 μl of the supernatant liquid, the acetaldehyde content was measured by GC-6A manufactured by Shimazu Seisakusho K.K.

Further, a haze of each polyethylene terephthalate after the solid phase polymerization was measured in the following manner. The results are also set forth in Table 1.

Measurement of Haze

After the solid phase polymerization, 2 kg of polyethylene terephthalate was dried by a tray dryer under the conditions of a temperature of 140° C. and a pressure of 1.3 kPa (10 Torr) for not shorter than 16 hours to decrease the moisture content to not more than 50 ppm.

Then, the dried polyethylene terephthalate was injection molded by a M-70A injection molding machine manufactured by Meiki Seisakusho K.K. under the conditions of a cylinder temperature of 275° C. and a mold cooling water temperature of 150° C., to prepare a stepped square molded product.

That is, the stepped square molded product was formed by feeding the dried polyethylene terephthalate through a hopper to an injection molding machine whose molding conditions had been so controlled that the metering time became 12 seconds and the injection time became 60 seconds. The residence time of the molten resin in the molding machine was about 72 seconds. The amount of the resin used was 75 g per stepped square molded product. As the specimen for measuring a haze, any one of the 11th to the 15th molded products formed after starting of the injection molding was adopted.

The stepped square molded product is in a shape shown in FIG. 1, in which the thickness of the A portion is about 6.5 mm, the thickness of the B portion is about 5 mm, and the thickness of the C portion is about 4 mm. Using a hazemeter HGM-2DP (Manufactured by Suga Test Instrument Co., LTD.), a haze of the C portion of the stepped square molded product was measured.

Table 1

| Catalyst | Acetaldehyde content in solid phase polymerization on product (ppm) | Haze of stepped square plate (4 mm) (%) |
|---|---|---|---|
| Ex. 8 | a1 | 0.9 | 1.2 |
| Ex. 9 | a2 | 1.0 | 1.0 |
| Ex. 10 | a3 | 1.0 | 0.9 |
| Ex. 11 | a4 | 0.9 | 1.1 |
| Ex. 12 | a5 | 1.0 | 1.1 |
| Ex. 13 | a6 | 0.9 | 1.2 |
| Ex. 14 | a7 | 1.1 | 1.1 |
| Comp. Ex. 2 | c1 | 0.9 | 1.8 |
| Comp. Ex. 3 | Sb acetate | 2.0 | 5.0 |

Example 15

Preparation of Solid Titanium Compound

Deionized water of 500 ml was weighed into a 1,000 ml glass beaker and cooled in an ice bath, followed by dropwise adding 5 g of titanium tetrachloride with stirring. When generation of hydrogen chloride stopped, the beaker was taken out of the ice bath, and 25% aqueous ammonia was dropwise added at room temperature with stirring to adjust pH of the liquid to 9. To the liquid, a 15% acetic acid aqueous solution was dropwise added at room temperature with stirring to adjust pH of the liquid to 5. The precipitate formed was separated by filtration. The precipitate was washed 5 times with deionized water. After washing, the precipitate was slurried with 10 wt % ethylene glycol-containing water to give a slurry having a concentration of 2.0% by weight, and the slurry was held for 30 minutes. Then, the slurry was subjected to granulation drying at a temperature of 90° C. using a two-fluid-nozzle type spray dryer, whereby a solid titanium compound (a8) was obtained.

The particle-size distribution width of the solid titanium compound (a8) was in the range of 0.5 to 25 μm, and the average particle diameter was 2.3 μm. The titanium content in the solid titanium compound (a8) was 39.5% by weight. It was confirmed by elemental analysis and EXAFS analysis that the solid titanium compound (a8) contained titanium, oxygen, carbon and hydrogen and had a Ti—O bond. The maximum solubility of the solid titanium compound (a8) in ethylene glycol was 4,000 ppm, and the weight ratio (Ti/C) of titanium to carbon was 4.

Example 16

Preparation of Solid Titanium Compound

Deionized water of 500 ml was weighed into a 1,000 ml glass beaker and cooled in an ice bath, followed by dropwise adding 5 g of titanium tetrachloride with stirring. When generation of hydrogen chloride stopped, the beaker was taken out of the ice bath, and 25% aqueous ammonia was dropwise added at room temperature with stirring to adjust pH of the liquid to 9. To the liquid, a 15% acetic acid aqueous solution was dropwise added at room temperature with stirring to adjust pH of the liquid to 5. The precipitate formed was separated by filtration. The precipitate was washed 5 times with deionized water. After washing, the precipitate was slurried with 30 wt % ethylene glycol-containing water to give a slurry having a concentration of 2.0% by weight, and the slurry was held for 30 minutes. Then, the slurry was subjected to granulation drying at a temperature of 90° C. using a disc type spray dryer, whereby a solid titanium compound (a9) was obtained.

The particle-size distribution width of the solid titanium compound (a9) was in the range of 0.5 to 30 µm, and the average particle diameter was 2.5 µm. The titanium content in the solid titanium compound (a9) was 29.8% by weight. It was confirmed by elemental analysis and EXAFS analysis that the solid titanium compound (a9) contained titanium, oxygen, carbon and hydrogen and had a Ti—O bond. The maximum solubility of the solid titanium compound (a9) in ethylene glycol was 4,500 ppm, and the weight ratio (Ti/C) of titanium to carbon was 3.

Example 17

Preparation of Solid Titanium Compound

Deionized water of 500 ml was weighed into a 1,000 ml glass beaker and cooled in an ice bath, followed by dropwise adding 7.5 g of titanium tetraisopropoxide with stirring. After the dropwise addition was completed, stirring was continued at room temperature for 30 minutes. After the stirring was completed, the precipitate formed was separated by filtration. The precipitate was slurried with 10 wt % ethylene glycol-containing water to give a slurry having a concentration of 2.0% by weight, and the slurry was held for 30 minutes. Then, the slurry was subjected to granulation drying at a temperature of 90° C. using a two-fluid-nozzle type spray dryer, whereby a solid titanium compound (a10) was obtained.

The particle-size distribution width of the solid titanium compound (a10) was in the range of 0.5 to 20 µm, and the average particle diameter was 2.0 µm. The titanium content in the solid titanium compound (a10) was 45.4% by weight. It was confirmed by elemental analysis and EXAFS analysis that the solid titanium compound (a10) contained titanium, oxygen, carbon and hydrogen and had a Ti—O bond. The maximum solubility of the solid titanium compound (a10) in ethylene glycol was 3,000 ppm, and the weight ratio (Ti/C) of titanium to carbon was 5.

Example 18

Preparation of Solid Titanium Compound

Deionized water of 500 ml was weighed into a 1,000 ml glass beaker. Then, 0.15 g of anhydrous magnesium hydroxide was added to the water and dispersed therein. The resulting suspension was cooled in an ice bath, followed by dropwise adding 5 g of titanium tetrachloride with stirring. With the dropwise addition, the liquid became acidic, and the dispersed magnesium hydroxide was dissolved. When generation of hydrogen chloride stopped, the beaker was taken out of the ice bath, and 25% aqueous ammonia was dropwise added at room temperature with stirring to adjust pH of the liquid to 9. To the liquid, a 15% acetic acid aqueous solution was dropwise added at room temperature with stirring to adjust pH of the liquid to 5. The precipitate of titanium-containing complex hydroxide formed was separated by filtration. The precipitate was washed 5 times with deionized water. After washing, the precipitate was slurried with 10 wt % ethylene glycol-containing water to give a slurry having a concentration of 2.0% by weight, and the slurry was held for 30 minutes. Then, the slurry was subjected to granulation drying at a temperature of 90° C. using a two-fluid-nozzle type spray dryer, whereby a solid titanium compound (a11) was obtained.

The particle-size distribution width of the solid titanium compound (a11) was in the range of 0.5 to 29 µm, and the average particle diameter was 2.4 µm. The titanium content in the solid titanium compound (a11) was 32.5% by weight, and the magnesium content therein was 3.0% by weight. It was confirmed by elemental analysis and EXAFS analysis that the solid titanium compound (a11) contained titanium, oxygen, carbon and hydrogen and had a Ti—O bond. The maximum solubility of the solid titanium compound (a11) in ethylene glycol was 3,000 ppm, and the weight ratio (Ti/C) of titanium to carbon was 3.

Comparative Example 4

Preparation of Solid Titanium Compound

The solid titanium compound (c1) prepared by Comparative Example 1 was roughly powdered into particles having an average particle diameter of not 10 µm but 30 µm or more, to obtain a solid titanium compound (c2) having a large average particle diameter.

Comparative Example 5

Preparation of Solid Titanium Compound

The solid titanium compound (c1) prepared by Comparative Example 1 was finely powdered into particles having an average particle diameter of not 10 µm but 1 µm or less, to obtain a solid titanium compound (c3) having a small average particle diameter.

Example 19

Preparation of Polyester

To a reactor in which 33,500 parts by weight of a reaction solution was resident (also in the steady operation, the same amount of a reaction solution is resident), a slurry prepared by mixing 6,458 parts by weight/hr of high-purity terephthalic acid with 2,615 part by weight/hr of ethylene glycol was continuously fed with stirring in a nitrogen atmosphere under the conditions maintained at 260° C. and 0.09 MPaG (0.9 kg/cm$^2$G), to perform esterification reaction. In the esterification reaction, a mixed liquid of water and ethylene glycol was distilled off.

The esterification reaction product (low condensate) was continuously drawn out of the system so as to control the mean residence time of the esterification reaction product to be 3.5 hours.

The number-average molecular weight of the low condensate of ethylene glycol and terephthalic acid obtained above was in the range of 600 to 1,300 (trimer to pentamer).

Then, liquid phase polycondensation reaction of the low condensate was carried out using the solid titanium compound (a8) prepared in Example 15 and magnesium acetate as polycondensation catalysts.

The catalytic amount of the solid titanium compound (a8) was 0.008% by mol in terms of a titanium atom and the catalytic amount of magnesium acetate was 0.015% by mol in terms of a magnesium atom, based on the terephthalic acid units in the low condensate. As a stabilizer, tributyl phosphate was added in an amount of 0.020% by mol in terms of a phosphorus atom. The polycondensation reaction was conducted under the conditions of 280° C. and 1 Torr.

The period of time (liquid phase polycondensation time) required for reaching of a polyethylene terephthalate intrinsic viscosity (IV) of 0.68 dl/g was 120 minutes.

The titanium content in the polyethylene terephthalate was 18 ppm, and the weight ratio (Mg/Ti) of the magnesium content to the titanium content was 1.

Example 20

Preparation of Polyester

Polycondensation reaction was carried out in the same manner as in Example 19, except that the solid titanium compound (a9) prepared in Example 16 was used as the polycondensation catalyst.

The period of time (liquid phase polycondensation time) required for reaching of a polyethylene terephthalate intrinsic viscosity (IV) of 0.68 dl/g was 113 minutes.

The titanium content in the polyethylene terephthalate was 18 ppm, and the weight ratio (Mg/Ti) of the magnesium content to the titanium content was 1.

Example 21

Preparation of Polyester

Polycondensation reaction was carried out in the same manner as in Example 19, except that the solid titanium compound (a10) prepared in Example 17 was used as the polycondensation catalyst.

The period of time (liquid phase polycondensation time) required for reaching of a polyethylene terephthalate intrinsic viscosity (IV) of 0.68 dl/g was 121 minutes.

The titanium content in the polyethylene terephthalate was 18 ppm, and the weight ratio (Mg/Ti) of the magnesium content to the titanium content was 1.

Example 22

Preparation of Polyester

Polycondensation reaction was carried out in the same manner as in Example 19, except that the solid titanium compound (a11) prepared in Example 18 was used as the polycondensation catalyst.

The period of time (liquid phase polycondensation time) required for reaching of a polyethylene terephthalate intrinsic viscosity (IV) of 0.68 dl/g was 121 minutes.

The titanium content in the polyethylene terephthalate was 18 ppm, and the weight ratio (Mg/Ti) of the magnesium content to the titanium content was 1.

Comparative Example 6

Preparation of Polyester

Polycondensation reaction was carried out in the same manner as in Example 19, except that the solid titanium compound (c2) prepared in Comparative Example 4 was used as the polycondensation catalyst.

The period of time (liquid phase polycondensation time) required for reaching of a polyethylene terephthalate intrinsic viscosity (IV) of 0.68 dl/g was 145 minutes.

Comparative Example 7

Preparation of Polyester

Polycondensation reaction was carried out in the same manner as in Example 19, except that the solid titanium compound (c3) prepared in Comparative Example 5 was used as the polycondensation catalyst.

The period of time (liquid phase polycondensation time) required for reaching of a polyethylene terephthalate intrinsic viscosity (IV) of 0.68 dl/g was 138 minutes.

Measurements of Acetaldehyde Content and Haze after Solid Phase Polymerization

After the liquid phase polycondensation, chips of the polyethylene terephthalate prepared in each of Examples 19 to 22 and Comparative Examples 6 and 7 were precrystallized at 17°° C. for 2 hours and then heated at 210° C. in an atmosphere of a nitrogen gas, to conduct solid phase polymerization until the intrinsic viscosity (IV) became 0.84 dl/g from 0.68 dl/g and thereby increase the molecular weight. The acetaldehyde content in each polyethylene terephthalate and the haze thereof after the solid phase polymerization were measured in the aforesaid manner. The results are set forth in Table 2, in which the results of Comparative Examples 2 and 3 are also set forth.

TABLE 2

| | Catalyst | Acetaldehyde content in solid phase polymerization on product (ppm) | Haze of stepped square plate (4 mm) (%) |
|---|---|---|---|
| Ex. 19 | a8 | 1.0 | 0.9 |
| Ex. 20 | a9 | 1.2 | 0.8 |
| Ex. 21 | a10 | 1.1 | 1.0 |
| Ex. 22 | a11 | 1.2 | 1.0 |
| Comp. Ex. 2 | c1 | 0.9 | 1.8 |
| Comp. Ex. 6 | c2 | 0.9 | 1.3* |
| Comp. Ex. 7 | c3 | 0.9 | 4.9 |
| Comp. Ex. 3 | Sb acetate | 2.0 | 5.0 |

*: A large amount of foreign matters were observed in the square plate.

Example 23

Preparation of Solid Titanium Compound

Deionized water of 500 ml was weighed into a 1000 ml glass beaker and cooled in an ice bath, followed by dropwise adding 5 g of titanium tetrachloride with stirring. When generation of hydrogen chloride stopped, the beaker was taken out of the ice bath, and 25% aqueous ammonia was dropwise added at room temperature with stirring to adjust pH of the liquid to 9. To the liquid, a 15% acetic acid aqueous solution was dropwise added at room temperature with stirring to adjust pH of the liquid to 5. The precipitate formed was separated by filtration. The precipitate was washed 5 times with deionized water. After washing, the precipitate was immersed in 20 wt % ethylene glycol-containing water for 30 minutes, and then solid-liquid separation was carried out by filtration similarly to the washing. After washing, the resulting titanium compound was subjected to vacuum drying at 40° C. and 1.3 kPa (10 Torr) for 20 hours to remove moisture, whereby a solid titanium compound was obtained. The solid titanium compound thus obtained was powdered into particles of about 10 to 20 μm prior to dissolving in ethylene glycol. The titanium content in the solid titanium compound was 35.4% by weight.

Preparation of Titanium-Containing Solution

Subsequently, ethylene glycol of 120 g was weighed into a 200 ml glass flask. Then, 1.02 g of the solid titanium compound prepared above was added and heated at 150° C. for 2 hours to dissolve the compound, whereby a titanium-containing solution (b1) was prepared. The titanium content in the solution was 3,000 ppm, the solution haze was 1.9%, and the moisture content was 0.12% by weight.

Example 24

Preparation of Titanium-Containing Solution

Ethylene glycol of 102 g and glycerol of 18 g were weighed into a 200 ml glass flask. Then, 1.69 g of a solid titanium compound prepared in the same manner as in Example 23 was added and heated at 170° C. f or 2 hours to dissolve the compound, whereby a titanium-containing solution (b2) was prepared. The titanium content in the solution was 5,000 ppm, the solution haze was 1.2%, and the moisture content was 0.06% by weight.

Example 25

Preparation of Titanium-Containing Solution

Ethylene glycol of 170 g and glycerol of 30 g were weighed into a 300 ml glass flask. Then, 5.65 g of a solid titanium 15 compound prepared in the same manner as in Example 23 was added and heated at 170° C. for 2 hours to dissolve the compound, whereby a titanium-containing solution (b3) was prepared. The titanium content in the solution was 10,000 ppm, the solution haze was 2.1%, and the moisture-content was 0.08% by weight.

Example 26

Preparation of Solid Titanium Compound

Deionized water of 500 ml was weighed into a 1,000 ml glass beaker and cooled in an ice bath, followed by dropwise adding 5 g of titanium tetrachloride with stirring. When generation of hydrogen chloride stopped, the beaker was taken out of the ice bath, and 25% aqueous ammonia was dropwise added at room temperature with stirring to adjust pH of the liquid to 5. The precipitate formed was separated by filtration. The precipitate was washed 5 times with deionized water. After washing, the precipitate was immersed in 20 wt % ethylene glycol-containing water for 30 minutes, and then solid-liquid separation was carried out by filtration similarly to the washing. After washing, the resulting titanium compound was subjected to vacuum drying at 40° C. and 1.3 kPa (10 Torr) for 20 hours to remove moisture, whereby a solid titanium compound was obtained. The solid titanium compound thus obtained was powdered into particles of about 10 to 20 $\mu$m prior to dissolving in ethylene glycol. The titanium content in the solid titanium compound was 34.6% by weight.

Preparation of Titanium-Containing Solution

Subsequently, ethylene glycol of 170 g and glycerol of 30 g were weighed into a 300 ml glass flask. Then, 5.78 g of the solid titanium compound prepared above was added and heated at 170° C. for 2 hours to dissolve the compound, whereby a titanium-containing solution (b4) was prepared. The titanium content in the solution was 10,000 ppm, the solution haze was 2.2%, and the moisture content was 0.10% by weight.

Example 27

Preparation of Solid Titanium Compound

Deionized water of 500 ml was weighed into a 1,000 ml glass beaker and cooled in an ice bath, followed by dropwise adding 7.5 g of titanium tetraisopropoxide with stirring. After the dropwise addition was completed, stirring was continued at room temperature for 30 minutes. After the stirring was completed, the precipitate formed was separated by filtration. The precipitate was washed 5 times with deionized water. The precipitate was immersed in 20 wt % ethylene glycol-containing water for 30 minutes, and then solid-liquid separation was carried out by filtration similarly to the washing. After washing, the resulting titanium compound was subjected to vacuum drying at 40° C. and 1.3 kPa (10 Torr) for 20 hours to remove moisture, whereby a solid titanium compound was obtained. The solid titanium compound thus obtained was powdered into particles of about 10 to 20 $\mu$m prior to dissolving in ethylene glycol. The titanium content in the solid titanium compound was 36.3% by weight.

Preparation of Titanium-Containing Solution

Subsequently, ethylene glycol of 170 g and glycerol of 30 g were weighed into a 300 ml glass flask. Then, 5.51 g of the solid titanium compound prepared above was added and heated at 170° C. for 2 hours to dissolve the compound, whereby a titanium-containing solution (b5) was prepared. The titanium content in the solution was 10,000 ppm, the solution haze was 3.0%, and the moisture content was 0.10% by weight.

Example 28

Preparation of Solid Titanium Compound

Deionized water of 500 ml was weighed into a 1,000 ml glass beaker and cooled in an ice bath, followed by dropwise adding 5 g of titanium tetrachloride with stirring. When generation of hydrogen chloride stopped, the beaker was taken out of the ice bath, and 25% aqueous ammonia was dropwise added at room temperature with stirring to adjust pH of the liquid to 9. To the liquid, a 15% acetic acid aqueous solution was dropwise added at room temperature with stirring to adjust pH of the liquid to 5. The precipitate formed was separated by filtration. The precipitate was washed 5 times with deionized water. After washing, the precipitate was slurried with 30 wt % ethylene glycol-containing water to give a slurry having a concentration of 2.0% by weight, and the slurry was held for 30 minutes. Then, the slurry was subjected to granulation drying at a temperature of 90° C. using a two-fluid-nozzle type spray dryer, whereby a solid titanium compound was obtained. The particle-diameter distribution width of the solid titanium compound was in the range of 0.5 to 20 $\mu$m, and the average particle diameter was 1.8 $\mu$m. The titanium content in the solid titanium compound was 34.8% by weight.

Preparation of Titanium-Containing Solution

Subsequently, ethylene glycol of 170 g and glycerol of 30 g were weighed into a 300 ml glass flask. Then, 5.75 g of the solid titanium compound prepared above was added and heated at 170° C. for 2 hours to dissolve the compound, whereby a titanium-containing solution (b6) was prepared. The titanium content in the solution was 10,000 ppm, the solution haze was 1.3%, and the moisture content was 0.08% by weight.

Example 29

Preparation of Titanium-Containing Solution

Ethylene glycol of 120 g was weighed into a 200 ml glass flask, and thereto was added 1.5 g of p-toluenesulfonic acid. Then, 6.76 g of a solid titanium compound prepared in the same manner as in Example 23 was added and heated at 160° C. for 1 hour to dissolve the compound, whereby a titanium-containing solution (b7) was prepared. The titanium content in the solution was 20,000 ppm, the solution haze was 5.1%, and the moisture content was 0.20% by weight.

Example 30

Preparation of Titanium-Containing Solution

Ethylene glycol of 120 g was weighed into a 200 ml glass flask, and thereto was added 1.5 g of sulfuric acid. Then, 6.76 g of a solid titanium compound prepared in the same manner as in Example 23 was added and heated at 170° C. for 1 hour to dissolve the compound, whereby a titanium-containing solution (b8) was prepared. The titanium content in the solution was 20,000 ppm, the solution haze was 4.8%, and the moisture content was 0.20% by weight.

Comparative Example 8

Preparation of Solid Titanium Compound

Deionized water of 500 ml was weighed into a 1,000 ml glass beaker and cooled in an ice bath, followed by dropwise adding 5 g of titanium tetrachloride with stirring. When generation of hydrogen chloride stopped, the beaker was taken out of the ice bath, and 25% aqueous ammonia was dropwise added at room temperature with stirring to adjust pH of the liquid to 9. To the liquid, a 15% acetic acid aqueous solution was dropwise added at room temperature with stirring to adjust pH of the liquid to 5. The precipitate formed was separated by filtration. The precipitate was washed 5 times with deionized water. After washing, solid-liquid separation was carried out by filtration similarly to the above. After washing, the resulting titanium compound was subjected to vacuum drying at 40° C. and 1.3 kPa (10 Torr) for 20 hours to remove moisture, whereby a solid titanium compound was obtained. The solid titanium compound thus obtained was powdered into particles of about 10 to 20 $\mu$m prior to dissolving in ethylene glycol. The titanium content in the solid titanium compound was 50.7% by weight.

Dissolving of Solid Titanium Compound in Ethylene Glycol

Ethylene glycol of 120 g was weighed into a 200 ml glass flask. Then, 2.36 g of the solid titanium compound prepared above was added and heated at 170° C. for 2 hours, but the compound could not be dissolved.

Example 31

Preparation of Polyester

To a reactor in which 33,500 parts by weight of a reaction solution was resident (also in the steady operation, the same amount of a reaction solution is resident), a slurry prepared by mixing 6,458 parts by weight/hr of high-purity terephthalic acid with 2,615 part by weight/hr of ethylene glycol was continuously fed with stirring in a nitrogen atmosphere under the conditions maintained at 260° C. and 0.09 MPaG (0.9 kg/cm$^2$G), to perform esterification reaction. In the esterification reaction, a mixed liquid of water and ethylene glycol was distilled off.

The esterification reaction product (low condensate) was continuously drawn out of the system so as to control the mean residence time of the esterification reaction product to be 3.5 hours.

The number-average molecular weight of the low condensate of ethylene glycol and terephthalic acid obtained above was in the range of 600 to 1,300 (trimer to pentamer).

Then, polycondensation reaction of the low condensate was carried out using the titanium-containing solution prepared in each of Example 23 to 30 as a polycondensation catalyst.

The catalyst was added in such an amount that the content thereof amounted to 9 ppm in terms of a titanium atom based on the resulting polyethylene terephthalate, and phosphoric acid was further added in such an amount that the content thereof amounted to 6 ppm in terms of a phosphorus atom based on the resulting polyethylene terephthalate. The polycondensation reaction was conducted under the conditions of 285° C. and 0.1 kPa (1 Torr), and the period of time (liquid phase polycondensation time) required to obtain a liquid phase polycondensation product, i.e., polyethylene terephthalate, having an intrinsic viscosity (IV) of 0.68 dl/g was measured. The result is set forth in Table 3.

Comparative Example 9

Polycondensation reaction was carried out in the same manner as in Example 31, except that antimony acetate industrially used as a polycondensation catalyst was used. The amount of the antimony acetate added was 0.025% by mol in terms of antimony based on the terephthalic acid units in the low condensate.

The period of time (liquid phase polycondensation time) required for reaching of a polyethylene terephthalate intrinsic viscosity (IV) of 0.68 dl/g was 164 minutes.

TABLE 3

| Titanium-containing solution | Liquid phase polycondensation time (min) |
|---|---|
| b1 | 97 |
| b2 | 95 |
| b3 | 94 |
| b4 | 95 |
| b5 | 91 |
| b6 | 90 |
| b7 | 94 |
| b8 | 92 |
| Sb acetate | 164 |

Example 32

Preparation of Polyester

To a reactor in which 33,500 parts by weight of a reaction solution was resident (in the steady operation), a slurry prepared by mixing 6,458 parts by weight/hr of high-purity terephthalic acid with 2,615 part by weight/hr of ethylene glycol was continuously fed with stirring in a nitrogen atmosphere under the conditions maintained at 260° C. and 0.09 MPaG (0.9 kg/cm$^2$G), to perform esterification reaction. In the esterification reaction, a mixed liquid of water and ethylene glycol was distilled off.

The esterification reaction product (low condensate) was continuously drawn out of the system so as to control the mean residence time of the esterification reaction product to be 3.5 hours.

The number-average molecular weight of the low condensate of ethylene glycol and terephthalic acid obtained above was in the range of 600 to 1,300 (trimer to pentamer).

Then, polycondensation reaction of the low condensate was carried out using the titanium-containing solution (b1) prepared in Example 23 as a polycondensation catalyst.

The catalyst was used in such an amount that the content thereof amounted to 18 ppm in terms of a titanium atom based on the resulting polyethylene terephthalate, and phosphoric acid is further added in such an amount that the content thereof amounted to 15 ppm in terms of a phosphorus atom based on the resulting polyethylene terephthalate. The liquid phase polycondensation reaction was conducted under the conditions of 280° C. and 0.1 kPa (1 Torr), and the period of time required to obtain a liquid phase polycondensation product, i.e., polyethylene terephthalate, having an intrinsic viscosity (IV) of 0.68 dl/g was measured.

Subsequently, chips of the polyethylene terephthalate obtained after the liquid phase polycondensation were subjected to precrystallization at 170° C. for 2 hours and then subjected to solid phase polycondensation at 210° C. to measure a period of time (solid phase polycondensation time) required for reaching of an intrinsic viscosity (IV) of 0.82 dl/g from 0.68 dl/g. The result is set forth in Table 4.

Comparative Example 10

Preparation of Catalyst

A titanium catalyst of butanol slurry was prepared in accordance with the method described in Example 1 of U.S. Pat. No. 3,463,742. The titanium content in the slurry was 4.2% by weight.

The slurry was mixed with ethylene glycol to confirm ethylene glycol solubility of the particles suspended in the slurry. During this operation, butanol was distilled off from the system. As a result, the particles suspended in the slurry having been mixed with ethylene glycol in a concentration of 2,000 ppm in terms of a titanium atom based on the ethylene glycol were dissolved in ethylene glycol, while the particles suspended in the slurry having been mixed with ethylene glycol in a concentration of 3,000 ppm in terms of a titanium atom based on the ethylene glycol were not dissolved in ethylene glycol.

Preparation of Polyester

Polyethylene terephthalate was prepared in the same manner as in Example 32, except that the titanium catalyst of butanol slurry obtained above was used instead of the catalyst prepared in Example 23. In this preparation process, the liquid phase polycondensation time and the solid phase polycondensation time were measured. The results are set forth in Table 4.

Comparative Example 11

Preparation of Catalyst

A titanium catalyst of ethylene glycol slurry was prepared in the same manner as in Comparative Example 10, except that butanol was replaced with ethylene glycol. The titanium content in the slurry was 4.2% by weight.

The slurry was mixed with ethylene glycol to confirm ethylene glycol solubility of the particles suspended in the slurry. As a result, the particles suspended in the slurry having been mixed with ethylene glycol in a concentration of 2,000 ppm in terms of a titanium atom based on the ethylene glycol were dissolved in ethylene glycol, while the particles suspended in the slurry having been mixed with ethylene glycol in a concentration of 3,000 ppm in terms of a titanium atom based on the ethylene glycol were not dissolved in ethylene glycol.

Preparation of Polyester

Polyethylene terephthalate was prepared in the same manner as in Example 32, except that the titanium catalyst of ethylene glycol slurry obtained above was used instead of the catalyst prepared in Example 23. In this preparation process, the liquid phase polycondensation time and the solid phase polycondensation time were measured. The results are set forth in Table 4.

TABLE 4

|  | Liquid phase polycondensation time (IV = 0.68 dl/g) | Solid phase polycondensation time (IV = 0.68 dl/g→0.82 dl/g) | Haze of stepped square plate (4 mm) (%) |
|---|---|---|---|
| Ex. 32 | 2.1 hr | 20 hr | 0.6 |
| Comp. Ex. 10 | 3.6 hr | 36 hr | 3.3 |
| Comp. Ex. 11 | 3.5 hr | 35 hr | 4.5 |

What is claimed is:

1. A catalyst for polyester preparation, comprising a solid titanium compound which contains titanium, oxygen, carbon and hydrogen and has a Ti—O bond, and having a maximum solubility in ethylene glycol, as measured when the catalyst is dissolved in ethylene glycol under heating at 150° C., of not less than 3,000 ppm in terms of a titanium atom.

2. The catalyst for polyester preparation as claimed in claim 1, wherein the weight ratio (Ti/C) of the titanium atom to the carbon atom in the solid titanium compound is in the range of 50 to 1.

3. The catalyst for polyester preparation as claimed in claim 1, wherein the maximum solubility of the solid titanium compound in ethylene glycol is in the range of 3,000 to 5,000 ppm in terms of a titanium atom.

4. The catalyst for polyester preparation as claimed in claim 1, wherein the solid titanium compound has an average particle diameter of 1 to 30 μm.

5. The catalyst for polyester preparation as claimed in claim 1, wherein the solid titanium compound further contains at least one element selected from the group consisting of beryllium, magnesium, calcium, strontium, barium, scandium, yttrium, lanthanum, zirconium, hafnium, vanadium, niobium, tantalum, chromium, molybdenum, tungsten, manganese, iron, ruthenium, cobalt, rhodium, nickel, palladium, copper, zinc, boron, aluminum, gallium, silicon, germanium, tin, antimony and phosphorus.

6. The catalyst for polyester preparation as claimed in claim 1, wherein the solid titanium compound is a contact product of a hydrolyzate of a titanium halide or a hydrolyzate of a titanium alkoxide with a polyhydric alcohol.

7. The catalyst for polyester preparation as claimed in claim 5, wherein the solid titanium compound is a contact product of a hydrolyzate of a mixture of a titanium halide or a titanium alkoxide and a compound of at least one element selected from the group consisting of beryllium, magnesium, calcium, strontium, barium, scandium, yttrium, lanthanum, zirconium, hafnium, vanadium, niobium, tantalum, chromium, molybdenum, tungsten, manganese, iron, ruthenium, cobalt, rhodium, nickel, palladium, copper, zinc, boron, aluminum, gallium, silicon, germanium, tin, antimony and phosphorus, with a polyhydric alcohol.

8. The catalyst for polyester preparation as claimed in claim 6 or 7, wherein the polyhydric alcohol is ethylene glycol or glycerol.

9. The catalyst for polyester preparation as claimed in claim 6 or 7, wherein the solid titanium compound is a compound obtained by drying the contact product of the hydrolyzate with the polyhydric alcohol using a granulation dryer.

10. A catalyst for polyester preparation, comprising:
(I) a solid titanium compound which contains titanium, oxygen, carbon and hydrogen and has a Ti—O bond, and having a maximum solubility in ethylene glycol, as measured when the catalyst is dissolved in ethylene glycol under heating at 150° C., of not less than 3,000 ppm in terms of a titanium atom, and
(II) a compound of at least one element selected from the group consisting of beryllium, magnesium, calcium, strontium, barium, boron, aluminum, gallium, manganese, cobalt, zinc, germanium, antimony and phosphorus.

11. A catalyst for polyester preparation, comprising a titanium-containing solution in which a contact product of a hydrolyzate of a titanium halide or a hydrolyzate of a titanium alkoxide with a polyhydric alcohol is dissolved in an ethylene glycol-containing solution in an amount of 3,000 to 100,000 ppm in terms of a titanium atom.

12. A catalyst for polyester preparation, comprising a titanium-containing solution in which a contact product of a hydrolyzate of a mixture of a titanium halide or a titanium alkoxide and a compound of at least one element selected from the group consisting of beryllium, magnesium, calcium, strontium, barium, scandium, yttrium, lanthanum, zirconium, hafnium, vanadium, niobium, tantalum, chromium, molybdenum, tungsten, manganese, iron, ruthenium, cobalt, rhodium, nickel, palladium, copper, zinc, boron, aluminum, gallium, silicon, germanium, tin, antimony and phosphorus, with a polyhydric alcohol is dissolved in ethylene glycol in an amount of not less than 3,000 ppm in term of a titanium atom.

13. The catalyst for polyester preparation as claimed in claim 11 or 12, wherein the titanium-containing solution has a haze of not more than 20%.

14. The catalyst for polyester preparation as claimed in claim 11 or 12, wherein the titanium-containing solution has a moisture content of 0.05 to 2.0% by weight.

15. The catalyst for polyester preparation as claimed in claim 11 or 12, wherein the titanium-containing solution contains a solubilizing agent.

16. The catalyst for polyester preparation as claimed in claim 15, wherein the titanium-containing solution contains the solubilizing agent in an amount of 1 to 50% by weight based on the ethylene glycol-containing solution.

17. The catalyst for polyester preparation as claimed in claim 15, wherein the solubilizing agent is glycerol or trimethylolpropane.

18. The catalyst for polyester preparation as claimed in claim 11 or 12, wherein the titanium-containing solution contains an acid component.

19. The catalyst for polyester preparation as claimed in claim 18, wherein the titanium-containing solution contains the acid component in an amount of 1 to 20% by weight based on the ethylene glycol-containing solution.

20. The catalyst for polyester preparation as claimed in claim 18, wherein the acid component is sulfuric acid or an organic sulfonic acid.

21. A catalyst for polyester preparation, comprising:
(I) a titanium-containing solution in which a contact product of a hydrolyzate of a titanium halide or a hydrolyzate of a titanium alkoxide with a polyhydric alcohol is dissolved in an ethylene glycol-containing solution in an amount of 3,000 to 100,000 ppm in terms of a titanium atom, and
(II) a compound of at least one element selected from the group consisting of beryllium, magnesium, calcium, strontium, barium, boron, aluminum, gallium, manganese, cobalt, zinc, germanium, antimony and phosphorus.

22. A process for preparing a polyester, comprising polycondensing a dicarboxylic acid or its ester-forming derivative and a diol or its ester-forming derivative in the presence of a catalyst for polyester preparation to prepare a polyester, wherein the catalyst is selected from,
a catalyst comprising a solid titanium compound which contains titanium, oxygen, carbon and hydrogen and has a Ti—O bond, and having a maximum solubility in ethylene glycol, as measured when the catalyst is dissolved in ethylene glycol under heating at 150° C., of not less than 3,000 ppm in terms of a titanium atom,
a catalyst comprising a titanium-containing solution in which a contact product of a hydrolyzate of a titanium halide or a hydrolyzate of a titanium alkoxide with a polyhydric alcohol is dissolved in an ethylene glycol-containing solution in an amount of 3,000 to 100,000 ppm in terms of a titanium atom,
a catalyst comprising a solid titanium compound which contains titanium, oxygen, carbon and hydrogen and has a Ti—O bond, and having a maximum solubility in ethylene glycol, as measured when the catalyst is dissolved in ethylene glycol under heating at 150° C., of not less than 3,000 ppm in terms of a titanium atom, and a compound of at least one element selected from the group consisting of beryllium, magnesium, calcium, strontium, barium, boron, aluminum, gallium, manganese, cobalt, zinc, germanium, antimony and phosphorus, and
a catalyst a titanium-containing solution in which a contact product of a hydrolyzate of a titanium halide or a hydrolyzate of a titanium alkoxide with a polyhydric alcohol is dissolved in an ethylene glycol-containing solution in an amount of 3,000 to 100,000 ppm in terms of a titanium atom, and a compound of at least one element selected from the group consisting of beryllium, magnesium, calcium, strontium, barium, boron, aluminum, gallium, manganese, cobalt, zinc, germanium, antimony and phosphorus.

23. The process for preparing a polyester as claimed in claim 22, wherein the polyester is an aromatic polyester.

24. The process for preparing a polyester as claimed in claim 23, wherein the aromatic polyester is polyethylene terephthalate.

25. A polyester obtained by the process for preparing a polyester of claim 22.

26. The polyester as claimed in claim 25, which is an aromatic polyester.

27. The polyester as claimed in claim 25, which is polyethylene terephthalate.

28. The polyester as claimed in claim 27, wherein the titanium content is in the range of 1 to 100 ppm and the weight ratio (Mg/Ti) of the magnesium content to the titanium content is not less than 0.01.

* * * * *